United States Patent
Wynnik et al.

(10) Patent No.: US 10,211,581 B2
(45) Date of Patent: Feb. 19, 2019

(54) BUSWAY STAB ASSEMBLIES AND RELATED SYSTEMS AND METHODS

(71) Applicant: Eaton Corporation, Cleveland, OH (US)

(72) Inventors: Michael Anthony Wynnik, Pelzer, SC (US); Gordon Stanley Pettersen, Greenwood, SC (US); John Michael Kokenda, Greenwood, SC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/587,731

(22) Filed: May 5, 2017

(65) Prior Publication Data
US 2018/0323560 A1 Nov. 8, 2018

(51) Int. Cl.
| | |
|---|---|
| H01R 25/00 | (2006.01) |
| H01R 25/14 | (2006.01) |
| H01R 13/22 | (2006.01) |
| H01R 13/24 | (2006.01) |
| H01R 13/58 | (2006.01) |

(52) U.S. Cl.
CPC .......... *H01R 25/142* (2013.01); *H01R 13/22* (2013.01); *H01R 13/2442* (2013.01); *H01R 13/5825* (2013.01)

(58) Field of Classification Search
CPC . H01R 25/14; H01R 4/34; H02G 5/08; H02G 5/007; H02G 3/288; H02G 5/06
USPC ........ 439/115, 116, 118–120, 212, 213, 215, 439/217; 174/88 B, 99 B
See application file for complete search history.

(56) References Cited

U.S. PATENT DOCUMENTS

| | | | | |
|---|---|---|---|---|
| 3,531,758 A | * | 9/1970 | Blumkin | H01R 25/14 174/88 B |
| 3,559,146 A | * | 1/1971 | Valtonen | H01R 25/14 200/51.05 |

(Continued)

FOREIGN PATENT DOCUMENTS

| | | |
|---|---|---|
| DE | 2119572 | 11/1972 |
| DE | 2123152 | 11/1972 |

(Continued)

OTHER PUBLICATIONS

Starline Track Busway, Busway Series B60, B100C, B160, B225, Products, Components and Accessories, Universal Electric Corporation, www.uecorp.com, Cat. No. 1-01, available as of filed.

*Primary Examiner* — Thanh Tam Le
(74) *Attorney, Agent, or Firm* — Myers Bigel, P.A.

(57) ABSTRACT

A plug-in device for use with a busway system comprising a busway housing defining a longitudinal axis includes a stab base housing having first and second opposite sides, one or more stab conductors extending out of and away from the stab base housing at each of the first and second sides of the stab base housing, and a ground conductor at an upper portion of the stab base housing. The stab base housing is configured to be received through an opening at a bottom portion of the busway housing and positioned in a first position and then rotated from the first position to a second position. The ground conductor is configured to contact a top wall of the busway housing in each of the first and second positions.

20 Claims, 26 Drawing Sheets

(56) References Cited

U.S. PATENT DOCUMENTS

| | | | |
|---|---|---|---|
| 3,718,816 A * | 2/1973 | Seelbach | F21V 21/35 |
| | | | 174/99 B |
| 3,737,834 A * | 6/1973 | Contratto | H01R 25/142 |
| | | | 439/118 |
| 3,801,951 A | 4/1974 | Kemmerer et al. | |
| 3,813,633 A | 5/1974 | Clement | |
| 3,832,503 A | 8/1974 | Crane | |
| 3,848,715 A * | 11/1974 | Hesse | H01R 25/142 |
| | | | 191/12 R |
| 3,894,170 A | 7/1975 | Schinzel | |
| 3,933,403 A * | 1/1976 | Rubesamen | H01R 25/142 |
| | | | 439/121 |
| 3,973,818 A * | 8/1976 | Soquenne | H01R 25/14 |
| | | | 200/50.31 |
| 4,032,208 A * | 6/1977 | Berkenhoff | H01R 25/142 |
| | | | 200/51.08 |
| 4,163,595 A * | 8/1979 | Vasseur | H01R 25/142 |
| | | | 439/121 |
| 4,655,520 A | 4/1987 | Cummings | |
| 4,676,567 A | 6/1987 | Mouchi | |
| 4,822,292 A * | 4/1989 | Thayer | H01R 25/142 |
| | | | 439/115 |
| 4,919,625 A | 4/1990 | Coutre | |
| 4,950,841 A | 8/1990 | Walker et al. | |
| 5,092,787 A | 3/1992 | Wise et al. | |
| 5,811,733 A | 9/1998 | Flaig | |
| 5,821,464 A | 10/1998 | Graham et al. | |
| 6,033,239 A | 3/2000 | Jaakkola et al. | |
| 6,039,584 A | 3/2000 | Ross | |
| 6,105,741 A | 8/2000 | Ross | |
| 6,176,711 B1 | 1/2001 | Rohr et al. | |
| 6,203,339 B1 | 3/2001 | Nieminen | |
| 6,296,498 B1 | 10/2001 | Ross | |
| 6,358,070 B1 | 3/2002 | Lin | |
| 6,517,363 B2 | 2/2003 | Ross | |
| 6,521,837 B2 | 2/2003 | Hilgert et al. | |
| 6,884,095 B1 * | 4/2005 | Tsai | H01R 25/142 |
| | | | 439/118 |
| 7,455,535 B2 | 11/2008 | Insalaco et al. | |
| 7,614,895 B2 | 11/2009 | Jur et al. | |
| 7,718,895 B2 | 5/2010 | Rodriguez | |
| 7,744,386 B1 | 6/2010 | Speidel et al. | |
| 7,819,676 B1 | 10/2010 | Cardoso et al. | |
| 8,469,727 B2 | 6/2013 | Lindenau et al. | |
| 8,506,310 B2 | 8/2013 | Brandberg | |
| 8,540,526 B2 | 9/2013 | Mooney et al. | |
| 8,550,830 B1 | 10/2013 | Bhathija et al. | |
| 8,664,530 B2 | 3/2014 | Ross et al. | |
| 8,697,993 B2 | 4/2014 | Jur et al. | |
| 8,899,999 B2 * | 12/2014 | Mackiewicz | F21S 8/038 |
| | | | 439/118 |
| 8,900,002 B2 | 12/2014 | Mooney et al. | |
| 9,190,791 B1 | 11/2015 | Jaena et al. | |
| 9,197,045 B2 | 11/2015 | Jur et al. | |
| 9,275,774 B2 | 3/2016 | Ross et al. | |
| 9,379,502 B2 * | 6/2016 | Davidson, Jr. | H01R 25/142 |
| 9,520,688 B2 | 12/2016 | Sheridan et al. | |
| 9,520,703 B2 | 12/2016 | Jaena et al. | |
| 9,608,392 B1 | 3/2017 | Destro | |
| 9,673,583 B2 | 6/2017 | Hudson et al. | |
| 9,690,162 B2 | 6/2017 | Wilbur et al. | |
| 2007/0212932 A1 | 9/2007 | Jur et al. | |
| 2008/0090432 A1 | 4/2008 | Patterson et al. | |
| 2015/0236462 A1 | 8/2015 | Davidson, Jr. et al. | |
| 2016/0049759 A1 | 2/2016 | Jaena et al. | |
| 2016/0104985 A1 | 4/2016 | Ewing et al. | |
| 2016/0344148 A1 | 11/2016 | Mullins et al. | |
| 2016/0372909 A1 | 12/2016 | Baldwin et al. | |
| 2017/0170616 A1 | 6/2017 | Wynnik et al. | |

FOREIGN PATENT DOCUMENTS

| | | |
|---|---|---|
| DE | 2131065 | 1/1973 |
| DE | 3025913 | 2/1982 |
| EP | 1956688 | 8/2008 |

* cited by examiner

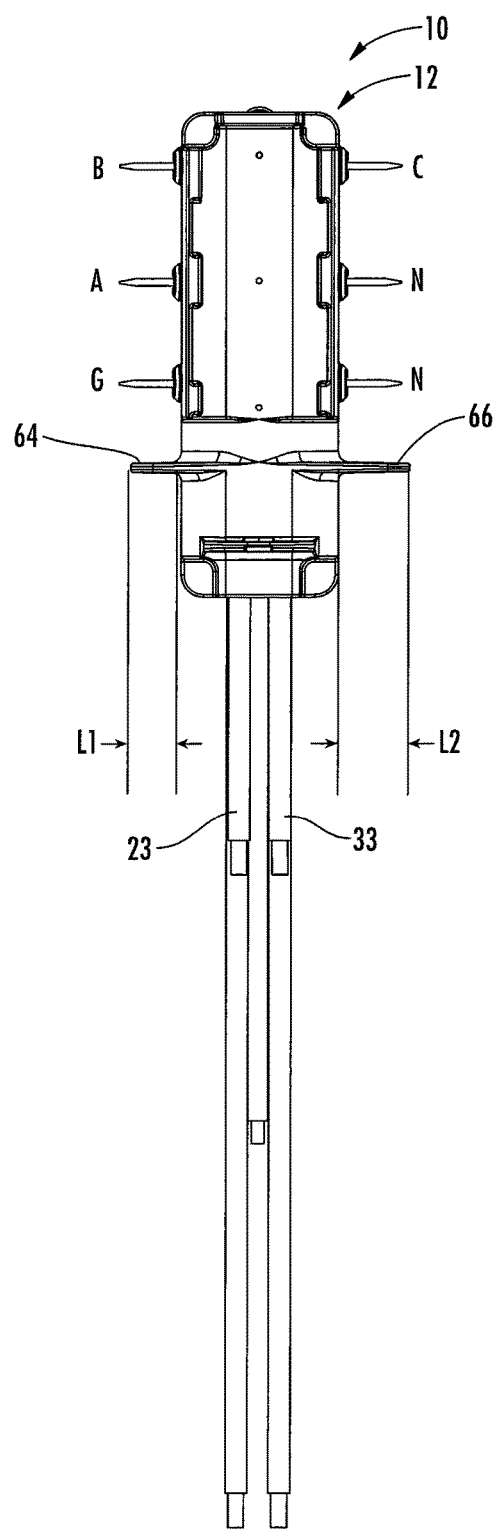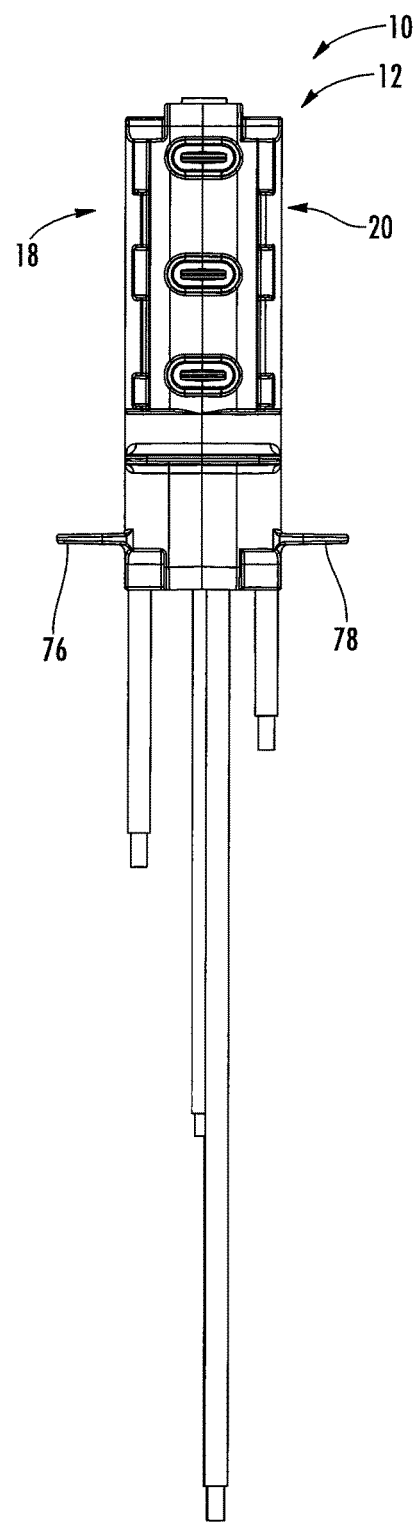
FIG. 3
FIG. 4

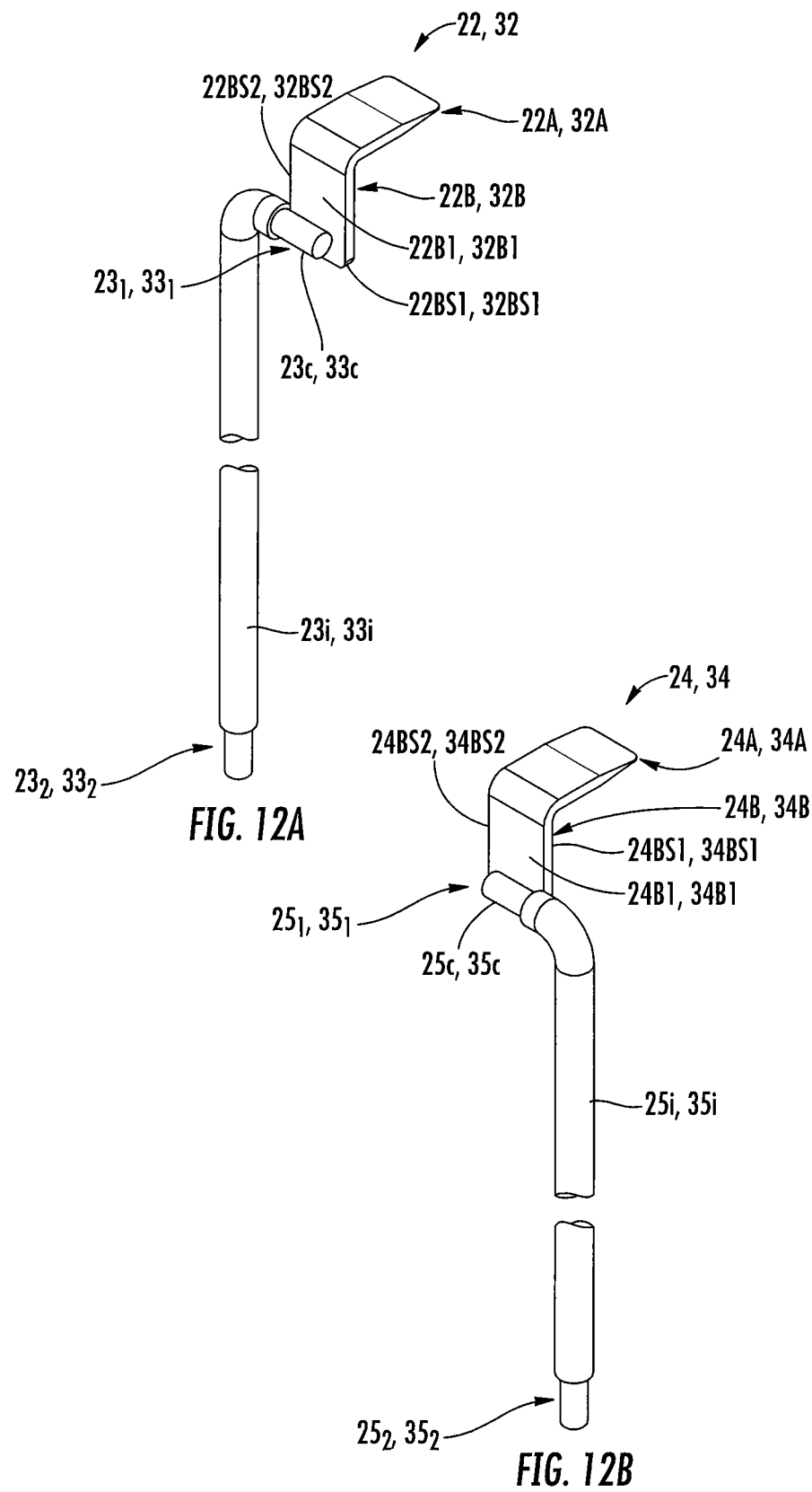

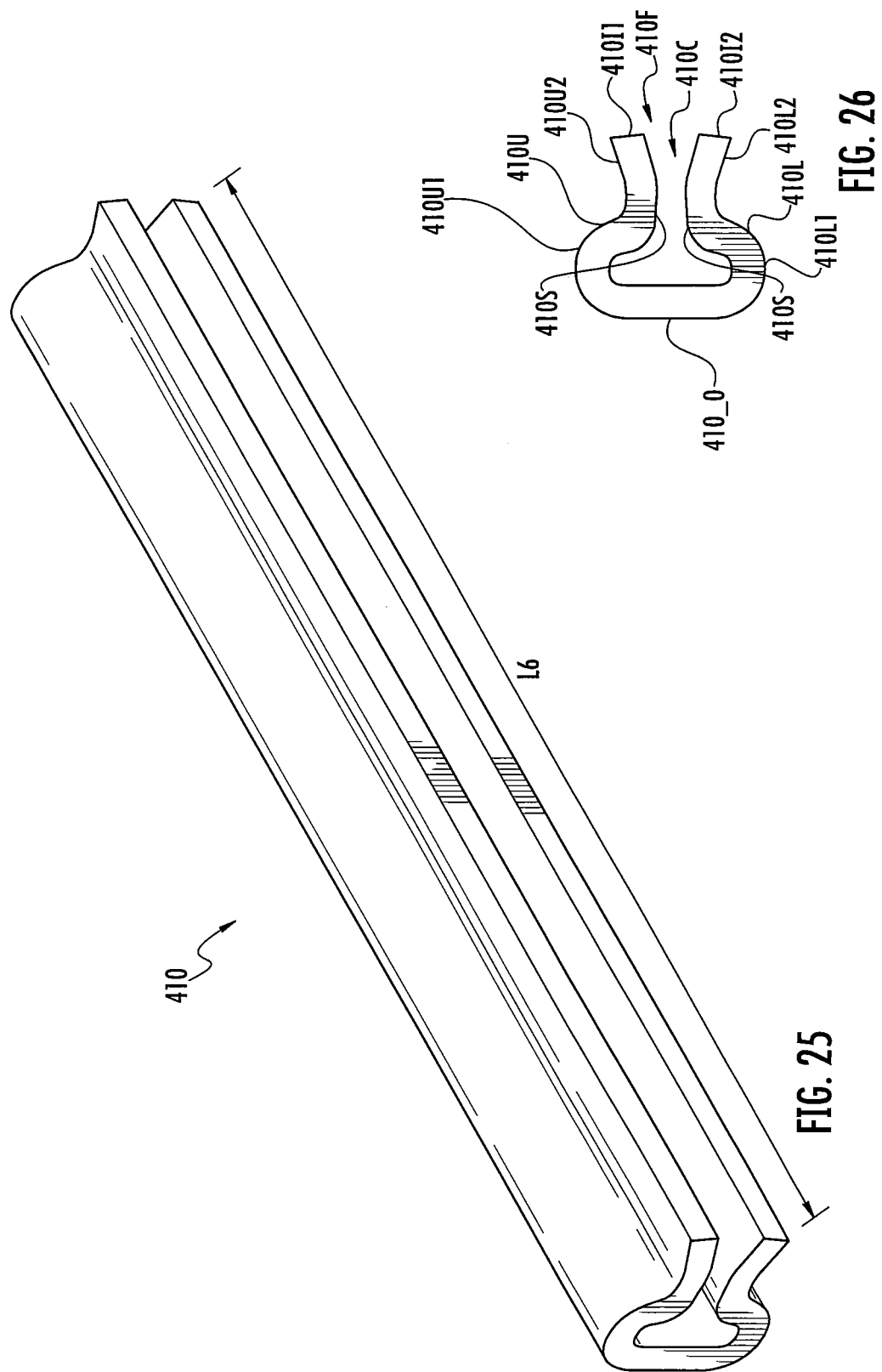

BUSWAY STAB ASSEMBLIES AND RELATED SYSTEMS AND METHODS

BACKGROUND

Busway systems typically include several elongated busway sections with busway joints between adjacent busway sections. The busway joint serves to electrically and mechanically connect the adjacent busway sections. Continuous plug-in busway systems allow for plug-in devices (e.g., outlet boxes) to be installed anywhere or substantially anywhere along the length of the busway sections.

SUMMARY

Some embodiments of the invention are directed to a plug-in device for use with a busway system including a busway housing defining a longitudinal axis. The device includes a stab base housing having first and second opposite sides, one or more stab conductors extending out of and away from the stab base housing at the first side of the stab base housing, one or more stab conductors extending out of and away from the stab base housing at the second side of the stab base housing, and a ground conductor at an upper portion of the stab base housing. The stab base housing is configured to be received through an opening at a bottom portion of the busway housing and positioned in a first position with each stab conductor extending away from the stab base housing in a direction substantially parallel to the longitudinal axis of the busway housing and with the ground conductor contacting a top wall of the busway housing. The stab base housing is configured to be rotated from the first position to a second position with each stab conductor extending away from the stab base housing in a direction substantially perpendicular to the longitudinal axis of the busway housing and with the ground conductor contacting the top wall of the busway housing.

The ground conductor may extend upwardly from the upper portion of the stab base housing above a top of the stab base housing. The ground conductor may be resilient and configured to deform downwardly in response to contacting the top wall of the busway housing.

The stab base housing may include first and second opposing walls with each of the first and second walls extending between the first and second sides of the stab base housing. The plug-in device may include a cable management member in an interior cavity of the stab base housing. The cable management member may include a central portion, a first side portion extending away from the central portion at one side thereof, and a second side portion extending away from the central portion at an opposite side thereof. The first side portion of the cable management member may be coupled to the first wall of the stab base housing and the second side portion of the cable management member may be coupled to the second wall of the stab base housing.

The plug-in device may include a first cable having a first end electrically connected to the ground conductor and a second, opposite end extending out of a bottom portion of the stab base housing. The cable management member central portion may define an elongate passageway. The first cable may be received in the passageway of the cable management member.

The one or more stab conductors extending out of and away from the stab base housing at the first side of the stab base housing may include first and second phase conductors. The one or more stab conductors extending out of and away from the stab base housing at the second side of the stab base housing may include a third phase conductor.

The plug-in device may include: a first cable having a first end electrically connected to the first phase conductor and a second, opposite end extending out of a bottom portion of the stab base housing; a second cable having a first end electrically connected to the second phase conductor and a second, opposite end extending out of the bottom portion of the stab base housing; and/or a third cable having a first end electrically connected to the third phase conductor and a second, opposite end extending out of the bottom portion of the stab base housing.

The first cable may extend external to and along one of the first and second side portions of the cable management member. The second cable may extend external to and along the other one of the first and second side portions of the cable management member.

The one or more stab conductors extending out of and away from the stab base housing at the second side of the stab base housing may include a third phase conductor and a neutral conductor. The plug-in device may include a fourth cable having a first end electrically connected to the neutral conductor and a second, opposite end extending out of the bottom portion of the stab base housing. The third cable may extend along one of the first and second side portions of the cable management member. The fourth cable may extend along the other one of the first and second side portions of the cable management member.

The first and second side portions of the cable management member may each include a laterally extending side with first face and a second opposite face. The first cable may extend along the first face of one of the first and second side portions of the cable management member. The third cable may extend along the second face of one of the first and second side portions of the cable management member.

In some embodiments, an enclosure is coupled to a lower portion of the stab base housing. A cable may extend from each stab conductor and from the ground conductor to outside the stab base housing at the lower portion thereof. Each cable may be electrically connected to components in the enclosure.

In some embodiments, each stab conductor is L-shaped with a first portion and a second portion that is perpendicular to the first portion. The first portion of each stab conductor may extend out of and away from the stab base housing. The second portion of each stab conductor may be at least partially held in a channel defined in the stab base housing.

Some other embodiments of the invention are directed to a busway system. The system includes a busway section. The busway section includes a busway housing defining a longitudinal axis, with the busway housing including first and second opposite side portions. The busway section includes a first insulator held in the first side portion of the busway housing, with the first insulator holding one or more bus bar conductors. The busway section includes a second insulator held in the second side portion of the busway housing, with the second insulator holding one or more bus bar conductors. The system includes a plug-in device. The plug-in device includes a stab base housing having first and second opposite sides, one or more stab conductors extending out of and away from the stab base housing at the first side of the stab base housing, one or more stab conductors extending out of and away from the stab base housing at the second side of the stab base housing, and a ground conductor extending upwardly out of an opening at an upper portion of the stab base housing. The stab base housing is configured to be received through an opening at a bottom portion of the busway housing and positioned in a first position with each stab conductor extending away from the stab base housing in a direction substantially parallel to the longitudinal axis of the busway housing and the ground conductor contacting a top wall of the busway housing. The stab base housing is configured to be rotated from the first position to a second position with each stab conductor extending away from the stab base housing in a direction substantially perpendicular to the longitudinal axis of the busway housing to electrically connect each stab conductor with one of the bus bar conductors.

In some embodiments, the ground conductor extends above a top of the stab base housing and is resilient and configured deform upwardly and downwardly in response to contacting the top wall of the busway housing.

A cable management member may be positioned in an interior cavity of the stab base housing. The ground conductor may include an arcuate center portion and first and second side portions that are attached to the stab base housing above the cable management member. A first cable may be electrically connected to the lower surface of the ground conductor. The first cable may extend downwardly through a channel defined in a central portion of the cable management member and out of a lower portion of the stab base housing.

The one or more stab conductors extending out of and away from the stab base housing at the first side of the stab base housing may include first and second phase conductors. The one or more stab conductors extending out of and away from the stab base housing at the second side of the stab base housing may include a third phase conductor. The cable management member may include a first side portion extending outwardly away from a first side of the central portion and a second side portion extending outwardly away from a second, opposite side of the central portion. A second cable may be electrically connected to the first phase conductor, a third cable may be electrically connected to the second phase conductor, and a fourth cable may be electrically connected to the third phase conductor. The second cable may extend along a first face of the first side portion of the cable management member and out of the lower portion of the stab base housing. The third cable may extend along a first face of the second side portion of the cable management member and out of the lower portion of the stab base housing. The fourth cable may extend along either a second, opposite face of the first side portion of the cable management member or a second, opposite face of the second side portion of the cable management member and out of the lower portion of the stab base housing.

Each bus bar conductor held in the first insulator may include an upper portion and an opposite lower portion. Each bus bar conductor held in the second insulator may include an upper portion and an opposite lower portion. In the second position, each one of the stab conductors extending out of and away from the stab base housing at the first side of the stab base housing may be received between and contact the upper and lower portions of one of the bus bar conductors held in the first insulator to be electrically connected therewith. In the second position, each one of the stab conductors extending out of and away from the stab base housing at the second side of the stab base housing may be received between and contact the upper and lower portions of one of the bus bar conductors held in the second insulator to be electrically connected therewith.

In some embodiments, each of the stab conductors includes an end portion that is tapered such that the end portion narrows in thickness from a central portion to an end of the stab conductor.

The stab base housing may include a first alignment tab on the first side of the stab base housing and a second alignment tab on the second side of the stab base housing. The first alignment tab may have a first length and the second alignment tab may have a second length that is greater than the first length. The busway housing may include a first channel and a second channel at the bottom portion of the busway, housing. The first channel may have a first depth and the second channel may have a second depth that is greater than the first depth. The first alignment tab may be received in the first channel and the second alignment tab may be received in the second channel when the stab base housing is in the second position.

Some other embodiments of the invention are directed to a method. The method includes providing a busway section. The busway section includes: a busway housing defining a longitudinal axis, with the busway housing including first and second opposite side portions; a first insulator held in the first side portion of the busway housing, with the first insulator holding one or more bus bar conductors; and a second insulator held in the second side portion of the housing, with the second insulator holding one or more bus bar conductors. The method includes providing a plug-in device. The plug-in device includes: a stab base housing having first and second opposite sides; one or more stab conductors extending out of and away from the stab base housing at the first side of the stab base housing; one or more stab conductors extending out of and away from the stab base housing at the second side of the stab base housing; and a ground conductor extending upwardly out of an opening at a top of the stab base housing. The method includes receiving the stab base housing through an opening at a bottom portion of the busway housing in a first position with each stab conductor extending away from the stab base housing in a direction substantially parallel to the longitudinal axis of the busway housing and with the ground conductor contacting a top wall of the busway housing. The method includes rotating the stab base housing from the first position to a second position with each stab conductor extending away from the stab base housing in a direction substantially perpendicular to the longitudinal axis of the busway housing.

In some embodiments, rotating the stab base housing from the first position to the second position includes electrically connecting each one of the stab conductors to one of the bus bar conductors.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 3 is a front view of the stab base assembly of FIG. 1.

FIG. 4 is a side view of the stab base assembly of FIG. 1.

FIGS. 12A-12C illustrate arrangements for electrically connecting a cable and a stab conductor according to various embodiments.

FIG. 25 is a perspective view of a bus bar conductor of the busway section of FIG. 19.

FIG. 26 is an end view of the conductor of FIG. 25.

DETAILED DESCRIPTION OF EMBODIMENTS OF THE INVENTION

Figure 1:
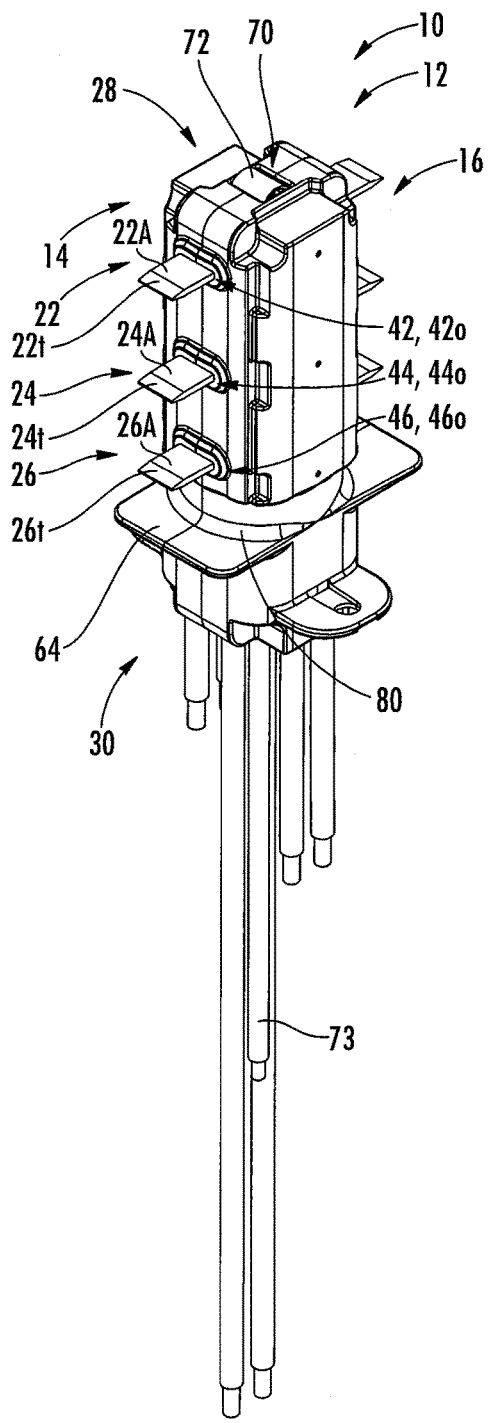
FIG. 1 is a perspective view of a stab base assembly according to some embodiments.
Figure 2:
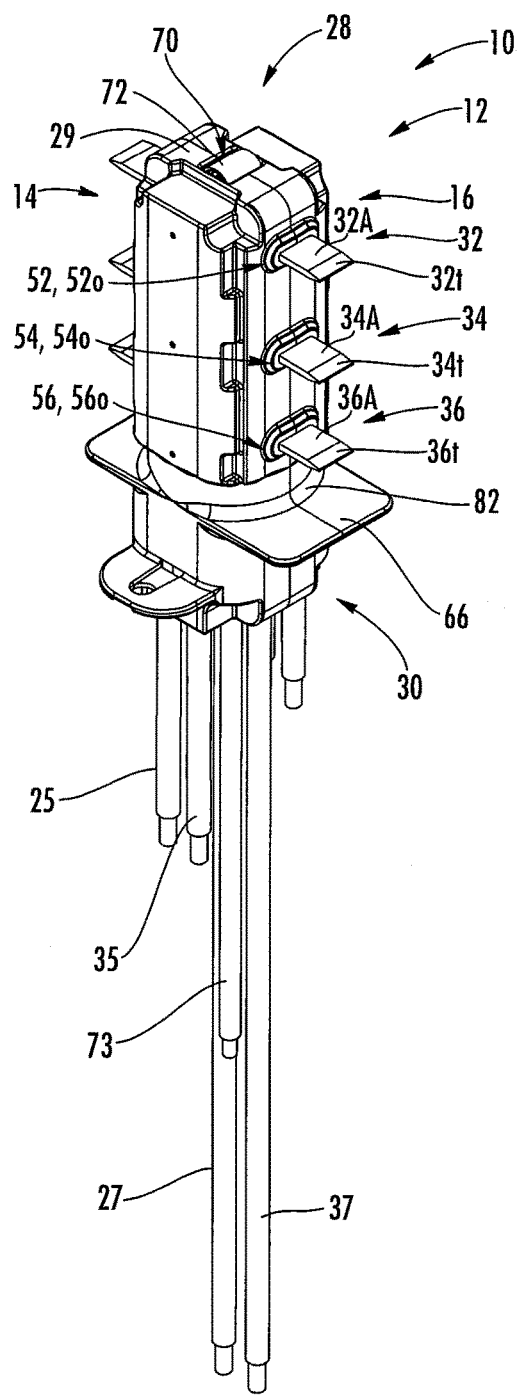
FIG. 2 is another perspective view of the stab base assembly of FIG. 1.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "includes," "comprising," and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In some embodiments, the term "substantially" when used in connection with a claimed angular relationship includes angles that are ±5° of the claimed angular relationship. In some other embodiments, the term "substantially" when used in connection with a claimed angular relationship includes angles that are ±3° of the claimed angular relationship. For example, an object that extends in a direction that is substantially perpendicular to an axis may form an angle with the axis that is between 85 and 95° or between 87 and 93° in various embodiments.

A stab base assembly 10 according to some embodiments is illustrated in FIGS. 1-4. The assembly 10 includes a stab base housing 12. The housing 12 includes first and second opposite sides 14, 16 and third and fourth opposite sides 18, 20. The first and second sides 14, 16 may be parallel or substantially parallel to one another. The third and fourth sides 18, 20 may be parallel or substantially parallel to one another. The third and fourth sides 18, 20 may also be perpendicular or substantially perpendicular to each of the first and second sides 14, 16.

The stab base housing 12 may be formed of an electrically insulating material. According to some embodiments, the housing 12 is formed of a polycarbonate or a thermoplastic polycarbonate. The housing 12 may be formed of Lexan™ available from SABIC (e.g., Lexan 3412ECR).

A plurality of stabs (or stab conductors) are held by the housing 12 and extend away from the housing 12. As described in more detail below, the stabs 22, 24, 26, 32, 34, 36 may be L-shaped or substantially L-shaped and include first portions 22A, 24A, 26A, 32A, 34A, 36A and second portions 22B, 24B, 26B, 32B, 34B, 36B. The first portions 22A, 24A, 26A of the stabs 22, 24, 26 may extend away from the first side 14 of the housing 12 and the first portions 32A, 34A, 36A of the stabs 32, 34, 36 may extend away from the second side 16 of the housing 12.

As described in more detail below, the stabs 22, 24, 26 may be held in channels 42, 44, 46 defined in the housing 12 and may extend out of openings 42o, 44o, 46o at the end of the channels 42, 44, 46 at the first side 14 of the housing 12. Similarly, the stabs 32, 34, and 36 may be held in channels 52, 54, 56 defined in the housing 12 and may extend out of openings 52o, 54o, 56o at the end of the channels 52, 54, 56 at the second side 16 of the housing 12.

The stabs 22, 24, 26, 32, 34, 36 may be formed of an electrically conductive material. According to some embodiments, the stabs 22, 24, 26, 32, 34, 36 are formed of or include copper or aluminum.

Each of the first portions 22A, 24A, 26A, 32A, 34A, 36A of the stabs 22, 24, 26, 32, 34, 36 may include a tapered end portion 22t, 24t, 26t, 32t, 34t, 36t such that the stab narrows in thickness from a central portion of the stab first portion to a distal end thereof.

The housing 12 includes a top or upper portion 28 and a bottom or lower portion 30. An opening 70 is defined in the upper portion 28 of the housing 12. A ground stab (or ground conductor) 72 extends outwardly and upwardly from the opening 70. The ground conductor 72 extends upwardly above a top 29 of the housing 12. The ground conductor 72 may be resilient (e.g., allow some deformation in the upward and downward directions). The ground conductor 72 may be formed of any suitable electrically conductive material, e.g., copper or aluminum.

Each stab conductor 22, 24, 26, 32, 34, 36 and the ground conductor 72 may include a cable or wire lead 23, 25, 27, 33, 35, 37, 73 associated therewith. Each cable 23, 25, 27, 33, 35, 37, 73 may extend from its associated conductor to outside the housing 12 at the lower portion 30 thereof. More specifically, each cable 23, 25, 27, 33, 35, 37, 73 may include a first end that is attached (e.g., brazed, welded, mechanically crimped, etc.) to its associated conductor and a second, opposite end that extends out the lower portion 30 of the housing 12 (e.g., out of one or more openings at the lower portion 30 of the housing 12). As described in more detail below, the second end of each cable may be connected to an enclosure that, along with the stab base assembly 10, forms a plug-in device or unit (e.g., the plug-in device or unit 120 shown in FIG. 17).

The stabs 22, 24, and 32 may be phase conductors for a three-phase circuit or system. For example, the stab 22 may be an A phase conductor, the stab 24 may be a B phase conductor, and the stab 32 may be a C phase conductor.

The stabs 26, 34 and/or 36 may be omitted in some embodiments. Where used, the stab 26 may be a ground conductor for a 200% ground rating. Where used, the stab 34 may be a neutral conductor. Where used in combination with the stab 34, the stab 36 may be a neutral conductor for a 200% neutral rating.

The stab base housing 12 may include at least one alignment feature, shown as first and second alignment tabs 64, 66. The first alignment tab 64 may extend outwardly away from the first side 14 of the housing 12 and a second alignment tab 66 may extend outwardly away from the second side 16 of the housing 12. The first tab 64 may have a first length L1 and the second tab 66 may have a second length L2. The second length L2 may be greater than the first length L1.

A coupling feature, such as first and second flanges 76, 78 may reside at the lower portion 30 of the housing 12, typically below the alignment tabs 64, 66. As illustrated, the first flange 76 extends outwardly away from the third side 18 of the housing 12 and the second flange 78 extends outwardly away from the fourth side 20 of the housing 12. Each flange 76, 78 may have an aperture defined therein to facilitate connection of the stab base assembly 10 to an enclosure (see, e.g., the aperture 76a shown in FIG. 17).

The stab base housing 12 according to some embodiments is shown in more detail in FIGS. 5-8. The housing 12 may be a two-piece housing and includes a first housing portion 12A and a second housing portion 12B. The first housing portion 12A includes a plurality of first coupling features 80 and the second housing portion 12B includes a plurality of second coupling features 82. The first and second coupling features 80, 82 are configured to cooperate such that the first and second housing portions 12A, 12B can be coupled together as shown in FIGS. 1-4. For example, the first coupling features 80 may include a plurality of apertures 80a and the second coupling features 82 may include a plurality of apertures 82a that can be aligned with the first plurality of apertures 80a and a fastener (e.g., a polymeric fastener) may be received through the aligned apertures to couple the first and second housing portions 12A, 12B. Other coupling features are contemplated (as just one example, one of the housing portions 12A, 12B may include one or more receptacles and the other of the housing portions 12A, 12B may include one or more plugs or posts that may be received in the receptacles with an interference fit to couple the first and second housing portions 12A, 12B). The first and second housing portions 12A, 12B may additionally or alternatively be coupled by adhesive bonding.

Figure 5:
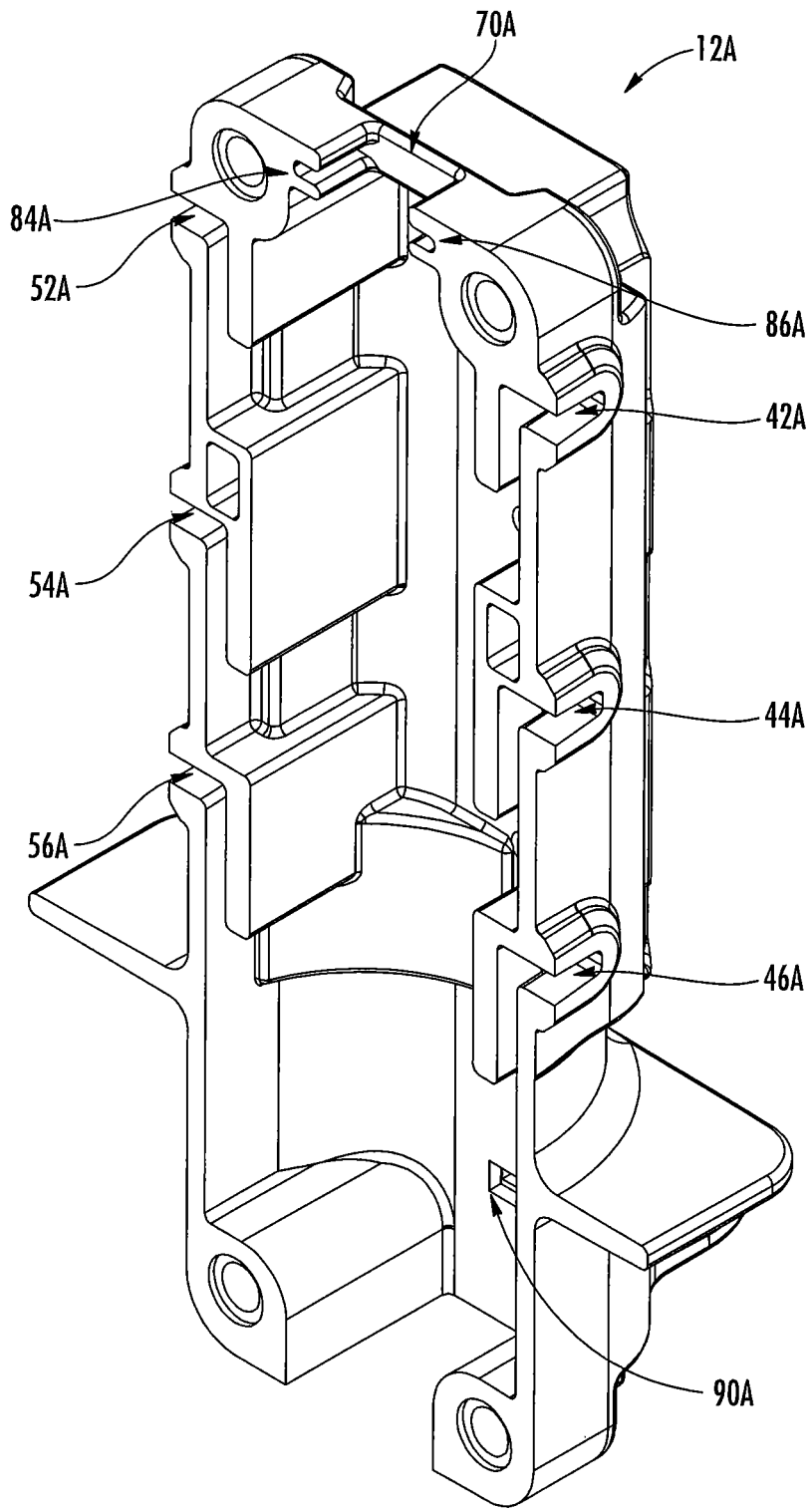
FIG. 5 is a perspective view of a first housing portion of the stab base assembly of FIG. 1.
Figure 6:
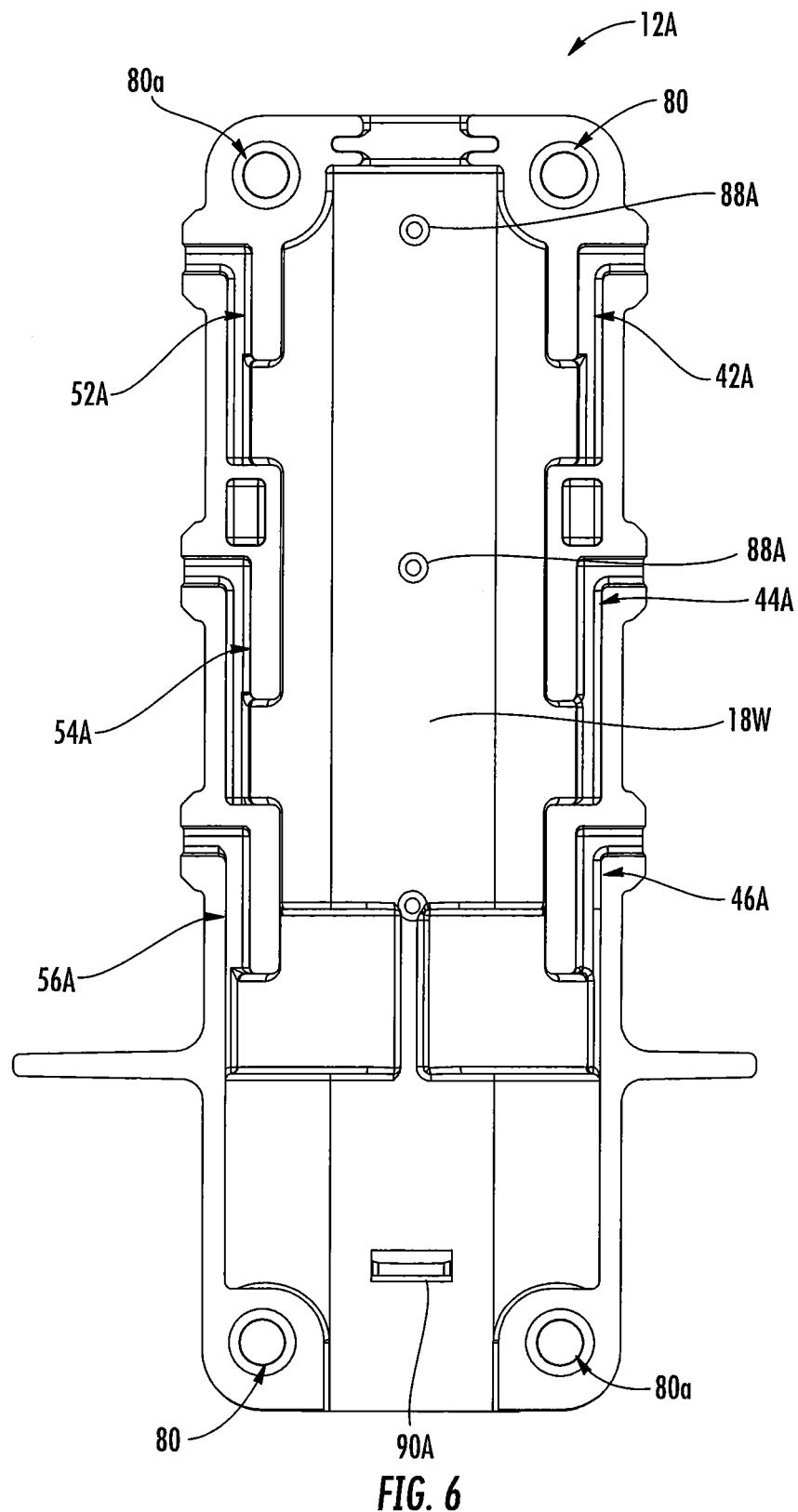
FIG. 6 is a side view of the first housing portion of FIG. 5.
Figure 7:
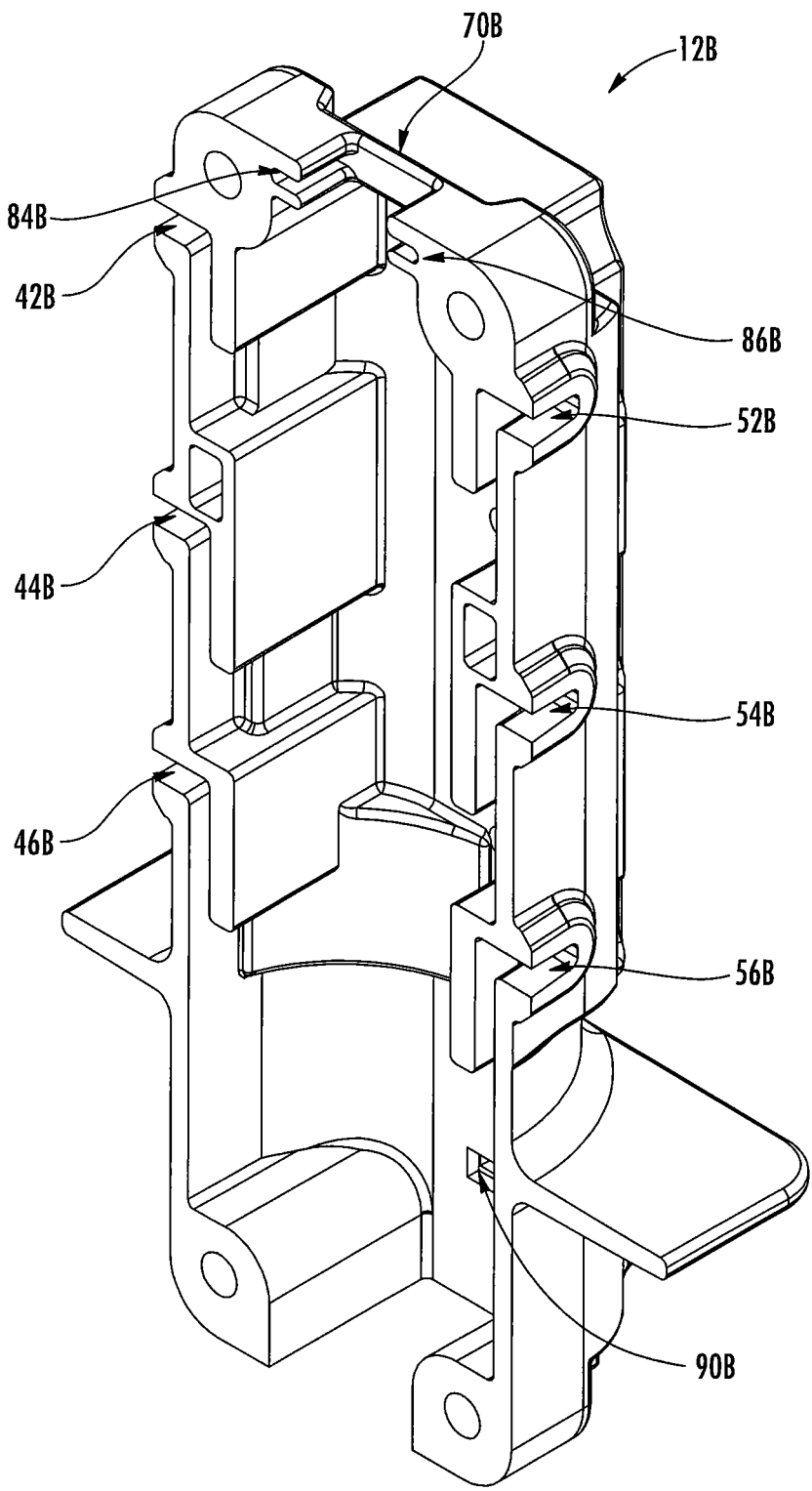
FIG. 7 is a perspective view of a second housing portion of the stab base assembly of FIG. 1.
Figure 8:
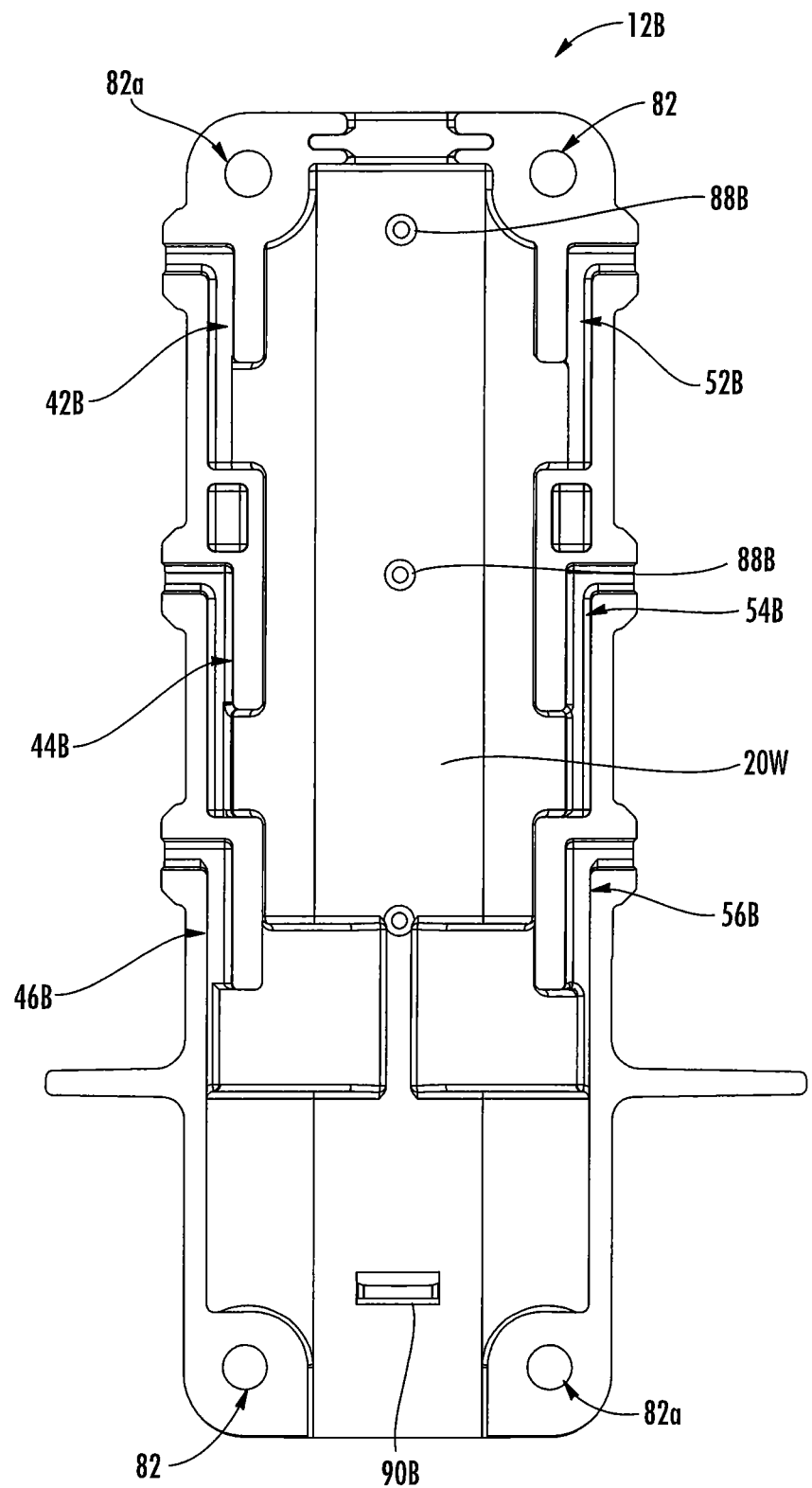
FIG. 8 is a side view of the second housing portion of FIG. 7.
Figure 16:
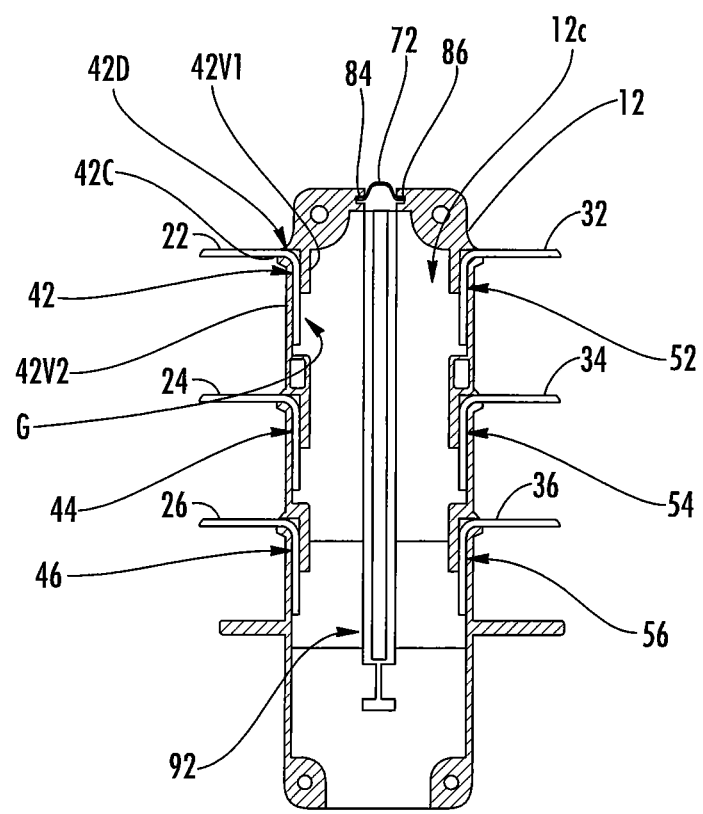
FIG. 16 is a sectional view of the stab base assembly of FIG. 1.

Referring to FIGS. 5 and 6, first housing portion 12A includes first through sixth channel portions 42A, 44A, 46A, 52A, 54A and 56A. Referring to FIGS. 7 and 8, the second housing portion 12B includes first through sixth channel portions 42B, 44B, 46B, 52B, 54B and 56B. When the first and second housing portions 12A, 12B are coupled, the channel portions 42A, 42B combine to define the first channel 42, the channel portions 44A, 44B combine to define the second channel 44, the channel portions 46A, 46B combine to define the third channel 46, the channel portions 52A, 52B combine to define the fourth channel 52, the channel portions 54A, 54B combine to define the fifth channel 54, and the channel portions 56A, 56B combine to define the sixth channel 56 (FIG. 16). One or more of the channels 42, 44, 46, 52, 54, 56 may be L-shaped or substantially L-shaped. The openings 42o, 44o, 46o, 52o, 54o and 56o (FIGS. 1 and 2) are defined at the end of the channels 42, 44, 46, 52, 54 and 56, respectively.

Figure 14:
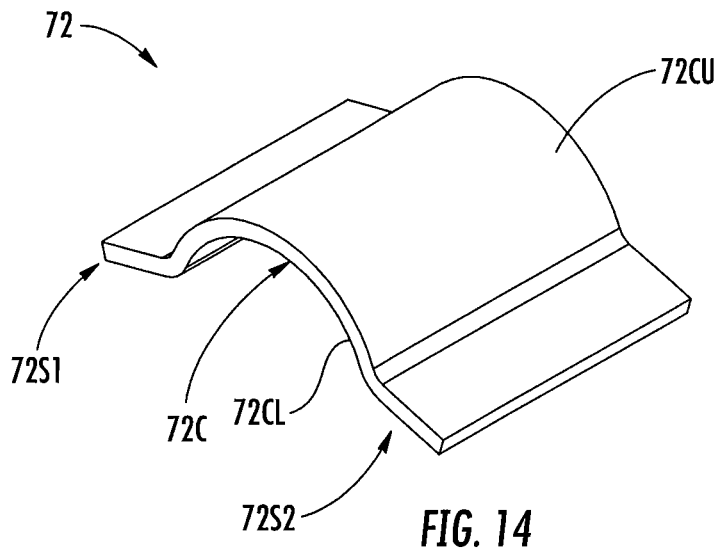
FIG. 14 is a perspective view of a ground conductor according to some embodiments.

The first housing portion 12A includes a recess 70A at an upper portion thereof. First and second opposite groove portions 84A, 86A are defined in the first housing portion 12A adjacent the recess 70A. The second housing portion 12B includes a recess 70B at an upper portion thereof. First and second opposite groove portions 84B, 86B are defined in the second housing portion 12B adjacent the recess 70B. When the first and second housing portions 12A, 12B are coupled, the recesses 70A, 70B combine to define the opening 70 (FIG. 1), the first groove portions 84A, 84B combine to define a first groove 84 adjacent the opening 70 (FIG. 16), and the second groove portions 86A, 86B combine to define a second groove 86 adjacent the opening 70 (FIG. 16). The grooves 84, 86 can hold ends of the ground conductor 72 (FIG. 14).

One or more cavities or depressions 88A and a slot 90A may be defined in the first housing portion 12A (FIG. 6). The cavities or depressions 88A and slot 90A may be defined in a wall 18W at the third side portion 18 of the stab base housing 12 (FIG. 4). One or more cavities or depressions 88B and a slot 90B may be defined in the second housing portion 12B (FIG. 8). The cavities or depressions 88B and slot 90B may be defined in a wall 20W at the fourth side portion 20 of the stab base housing 12 (FIG. 4). When the first and second housing portions 12A, 12B are coupled, the walls 18W and 20W face one another.

Figure 9:
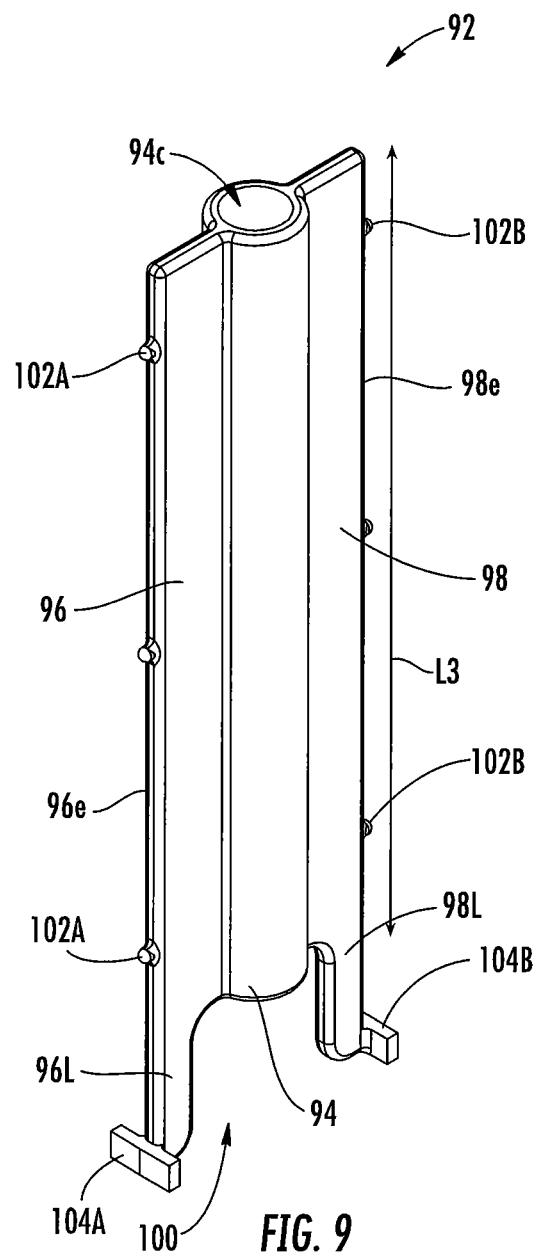
FIG. 9 is a perspective view of a cable management member according to some embodiments.
Figure 10:
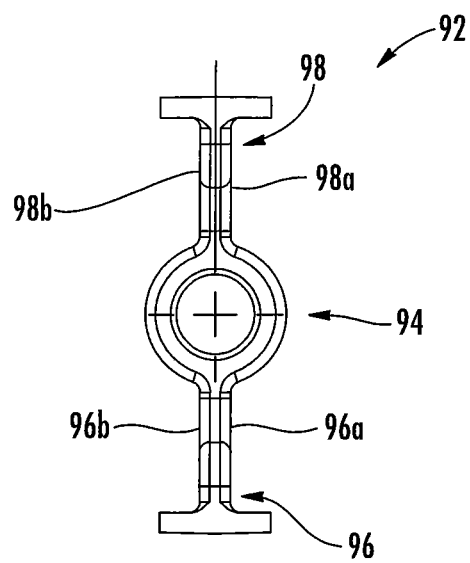
FIG. 10 is a top view of the cable management member of FIG. 9.

A cable or wire management member 92 is illustrated in FIGS. 9 and 10. The cable management member 92 includes a central portion or post 94 and first and second opposite lateral or side portions (or wings) 96, 98 that extend outwardly away from the central portion 94. The central portion 94 has a height or length L3 and the first and second side portions 96, 98 may extend along the entire length L3 of the central portion 94.

The central portion 94 defines a channel or passageway 94c that extends the entire length L3 of the central portion 94. The central portion 94 may be tubular.

The first side portion 96 includes a first face or surface 96a and an opposite second face or surface 96b. The first side portion 96 includes an outer edge 96e. The second side portion 98 includes a first face or surface 98a and an opposite second face or surface 98b. The second side portion 98 includes an outer edge 98e.

The first side portion 96 includes a leg 96L that extends downwardly below the central portion 94 on one side of the central portion 94 and the second side portion 98 includes a leg 98L that extends downwardly below the central portion 94 on the opposite side of the central portion 94. A recess 100 may be defined between the legs 96L and 98L.

One or more projections 102A may be on the outer edge 96e of the first side portion 96 and one or more projections 102B may be on the outer edge 98e of the second side portion 98. A foot 104A may be on the leg 96L and a foot 104B may be on the leg 98L.

The cable management member 92 is held within an interior chamber 12c of the stab base housing 12 (FIG. 16). More specifically, referring to FIGS. 5-10, the projection(s) 102A may be received in the depression(s) 88A of the first housing portion 12A and the projection(s) 102B may be received in the depression(s) 88B of the second housing portion 12B. Also, the foot 104A may be received in the slot 90A of the first housing portion 12A and the foot 104B may be received in the slot 90B of the second housing portion 12B. These features along with the dimensions (e.g., width) of the housing 12 and the cable management member 92 may allow the cable management member 92 to be held tightly in the interior chamber 12c of the housing 12.

With reference to FIGS. 4-10, the outer edge 96e of the first side portion 96 of the cable management member 92 may be at the third side portion 18 of the housing 12 and the outer edge 98e of the second side portion 98 of the cable management member 92 may be at the fourth side portion 20 of the housing 12. Therefore, the cable management member 92 may extend from the third side portion 18 to the fourth side portion 20 of the housing 12 in the interior cavity 12c thereof.

As will be described in more detail below, the cable management member 92 may facilitate guidance and/or management of one or more of the cables or wires extending from one or more of the stab conductors and/or from the ground conductor.

Figure 11:
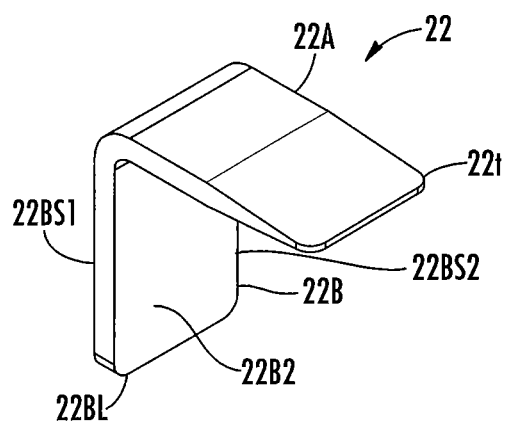
FIG. 11 is a perspective view of a stab conductor according to some embodiments.

The stab conductor 22 is illustrated in FIG. 11. The stab conductors 22, 24, 26, 32, 34, 36 may each have the same structure; accordingly, in the interest of brevity, only the stab conductor 22 will be described in detail below.

As described above, the stab conductor 22 includes first and second portions 22A, 22B. The first portion 22A may be perpendicular or substantially perpendicular to the second portion 22B. The stab conductor second portion 22B includes first and second opposite faces 22B1 (FIG. 12A) and 22B2. The stab second portion 22B includes a lower edge 22BL and first and second opposite side edges 22BS1 and 22BS2.

Referring to FIG. 16, a first upwardly extending channel 42 is defined in part by a first vertical wall 42V1 and a second vertical wall 42V2 (the channel 42 is further defined by a ledge 42C and a horizontal wall 42D). The first vertical wall 42V1 is shorter than the second vertical wall 42V2 so that a vertical gap G is provided between the first and second vertical walls 42V1, 42V2.

With reference to FIGS. 11, 12A and 16, the stab conductor 22 is held in the channel 42 with the second face 22B2 facing (and possibly abutting) the second vertical wall 42V2. A portion of the first face 22B1 faces (and possibly abuts) the first vertical wall 42V1. A lower portion of the first face 22B1 is exposed at the vertical gap G. This facilitates electrical connection with the cable or lead wire as will be described in more detail below.

It can be seen from FIG. 16 that the other (e.g., second through sixth) channels 44, 46, 52, 54, 56 have the same or substantially the same structure as the channel 42. Therefore, it will be understood that the stab conductor 24 may be held in the channel 44, the stab conductor 26 (where used) may be held in the channel 46, the stab conductor 32 may be held in the channel 52, the stab conductor 34 (where used) may be held in the channel 54, and/or the stab conductor 36 (where used) may be held in the channel 56 in the same or substantially the same way as described above in connection with the stab conductor 22 and the channel 42.

The stab conductor 22 with the cable 23 or the stab conductor 32 with the cable 33 is illustrated in FIG. 12A. The cable 23 or 33 includes an inner conductor 23c or 33c that is surrounded by an electrically insulating layer 23i or 33i. The cable 23 or 33 includes a first end $23_1$ or $33_1$ and an opposite second end $23_2$ or $33_2$. The cable first end $23_1$ or $33_1$ is electrically connected to the stab conductor 22 or 32 by joining (e.g., brazing, welding, mechanically crimping, etc.) the inner conductor 23c or 33c with the first face 22B1 or 32B1 of the stab conductor 22 or 32. As illustrated, the cable 23 or 33 is joined with the stab conductor 22 or 32 in a way that the cable 23 or 33 extends perpendicularly or substantially perpendicularly away from the second side edge 22BS2 or 32BS2 of the stab conductor second portion 22B or 32B.

The stab conductor 24 with the cable 25 or the stab conductor 34 with the cable 35 is illustrated in FIG. 12B. The cable 25 or 35 includes an inner conductor 25c or 35c that is surrounded by an electrically insulating layer 25i or 35i. The cable 25 or 35 includes a first end $25_1$ or $35_1$ and an opposite second end $25_2$ or $35_2$. The cable first end $25_1$ or $35_1$ is electrically connected to the stab conductor 24 or 34 by joining (e.g., brazing, welding, mechanically crimping, etc.) the inner conductor 25c or 35c with the first face 24B1 or 34B1 of the stab conductor 24 or 34. As illustrated, the cable 25 or 35 is joined with the stab conductor 24 or 34 in a way that the cable 25 or 35 extends perpendicularly or substantially perpendicularly away from the first side edge 24BS1 or 34BS1 of the stab conductor second portion 24B or 34B.

Figure 12C:
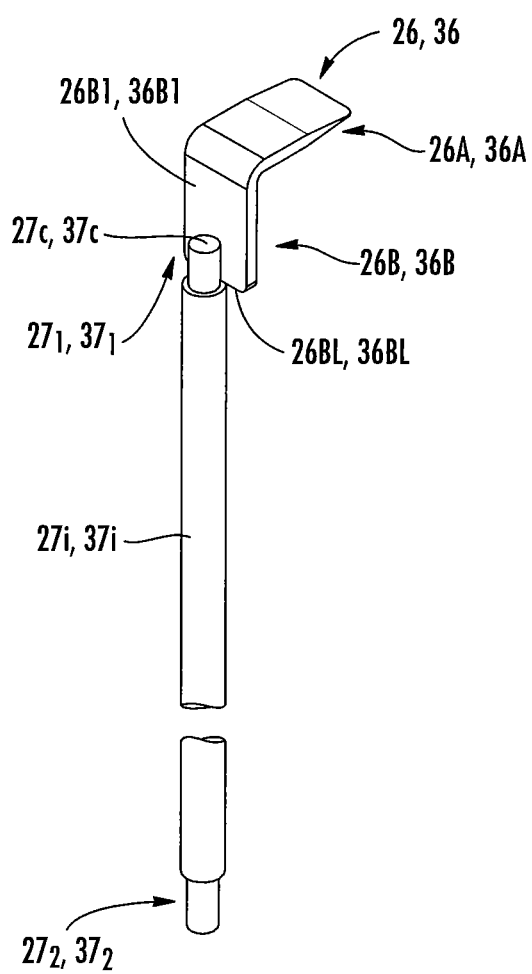

The stab conductor 26 with the cable 27 or the stab conductor 36 with the cable 37 is illustrated in FIG. 12C. The cable 27 or 37 includes an inner conductor 27c or 37c that is surrounded by an electrically insulating layer 27i or 37i. The cable 27 or 37 includes a first end $27_1$ or $37_1$ and an opposite second end $27_2$ or $37_2$. The cable first end $27_1$ or $37_1$ is electrically connected to the stab conductor 26 or 36 by joining (e.g., brazing, welding, mechanically crimping, etc.) the inner conductor 27c or 37c with the first face 26B1 or 36B1 of the stab conductor 26 or 36. As illustrated, the cable 27 or 37 is joined with the conductor 26 or 36 in a way that the cable 27 or 37 extends perpendicularly or substantially perpendicularly away from the lower edge 26BL or 36BL of the stab conductor second portion 26B or 36B.

Figure 13:
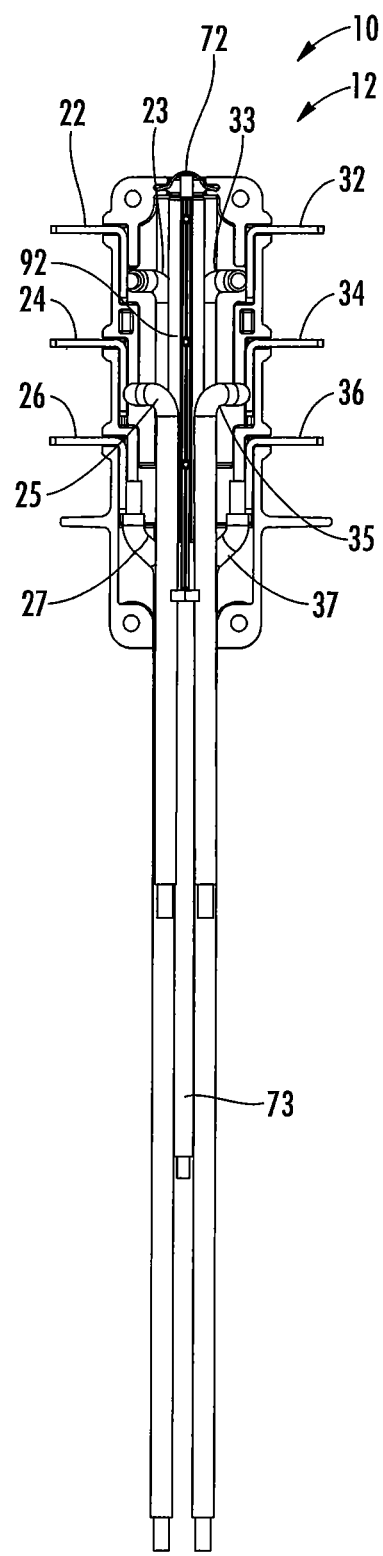
FIG. 13 is a sectional view of the stab base assembly of FIG. 1.

Such an arrangement can facilitate efficient cable or wire management. With reference to FIGS. 9, 10 and 13, the uppermost cables 23, 33 can be routed along one of the side portions 96, 98 of the cable management member 92 and downwardly out of the housing 12 and the cables 25, 35 can be routed along the other one of the side portions 96, 98 of the cable management member 92 and downwardly out of the housing 12. In some embodiments, the cables 23, 25, 33, 35 can be coupled (e.g., adhered) to the cable management member 92. The cables 27, 37 may be routed downwardly out of the housing 12. By routing the cables in different directions on each side of the cable management member 92 as described above, issues such as tangling or twisting of the cables can be avoided. In addition, the design provides necessary creepage and clearance distances between bare conductors.

It will be appreciated that alternative arrangements can provide the same or similar cable management advantages. For example, the cable 23 or 33 may be joined with the stab conductor 22 or 32 in a way that the cable 23 or 33 extends perpendicularly or substantially perpendicularly away from the first side edge 24BS1 or 34BS1 of the stab conductor second portion 22B or 32B. Similarly, the cable 25 or 35 may be joined with the stab conductor 24 or 34 in a way that the cable 25 or 35 extends perpendicularly or substantially perpendicularly away from the second side edge 24BS2 or 34BS2 of the stab conductor second portion 24B or 34B.

An example of the ground stab conductor 72 is illustrated in FIG. 14. As shown, the ground stab conductor 72 includes a center portion 72C and first and second lateral or side portions 72S1, 72S2 that extend away from opposite sides of the center portion 72C. The center portion 72C extends upwardly above the first and second side portions 72S1, 72S2. The center portion 72C may be arcuate and/or may include a concave lower face or surface 72CL and an opposite convex upper face or surface 72CU.

Figure 15:
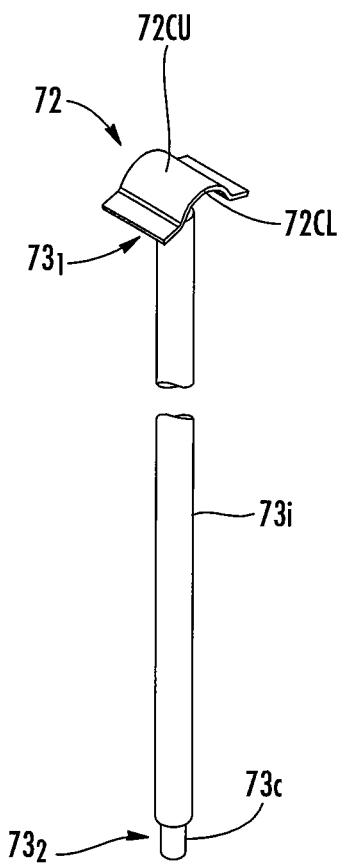
FIG. 15 illustrates a cable electrically connected to the ground conductor of FIG. 14.

The ground stab conductor 72 with the cable 73 electrically connected thereto is illustrated in FIG. 15. The cable 73 includes an inner conductor 73c and an outer electrically insulating layer 73i. The cable 73 includes a first end $73_1$ and an opposite second end $73_2$. The cable first end $73_1$ is electrically connected to the ground stab conductor 72 by joining (e.g., brazing, welding, mechanically crimping, etc.) the inner conductor 73c with the lower surface 72CL of the ground stab conductor 72.

Referring to FIGS. 9 and 13, the cable 73 associated with the ground stab conductor 72 is received in and through the channel 94c of the cable management member 92 and extends outside the stab base housing 12 at a bottom portion thereof. This further facilitates effective cable management within the interior of the stab base housing 12.

Referring to FIGS. 14-16, the side portions 72S1, 72S2 of the ground stab conductor 72 are received in the opposed grooves 84, 86 at the top portion of the stab base housing 12. The center portion 72C of the ground stab conductor 72 is received in the opening 70 at the top of the housing 12 and extends above the top 29 of the housing 12 (FIG. 1). As described below, the ground conductor 72 is configured to contact an upper wall of a busway housing. The ground conductor 72 may be dome shaped. The ground conductor 72 may be resilient and configured to deflect upwardly and downwardly in response to contacting the busway housing. The ground conductor 72 may be formed of any suitable electrically conductive material, e.g., copper or aluminum.

Figure 17:
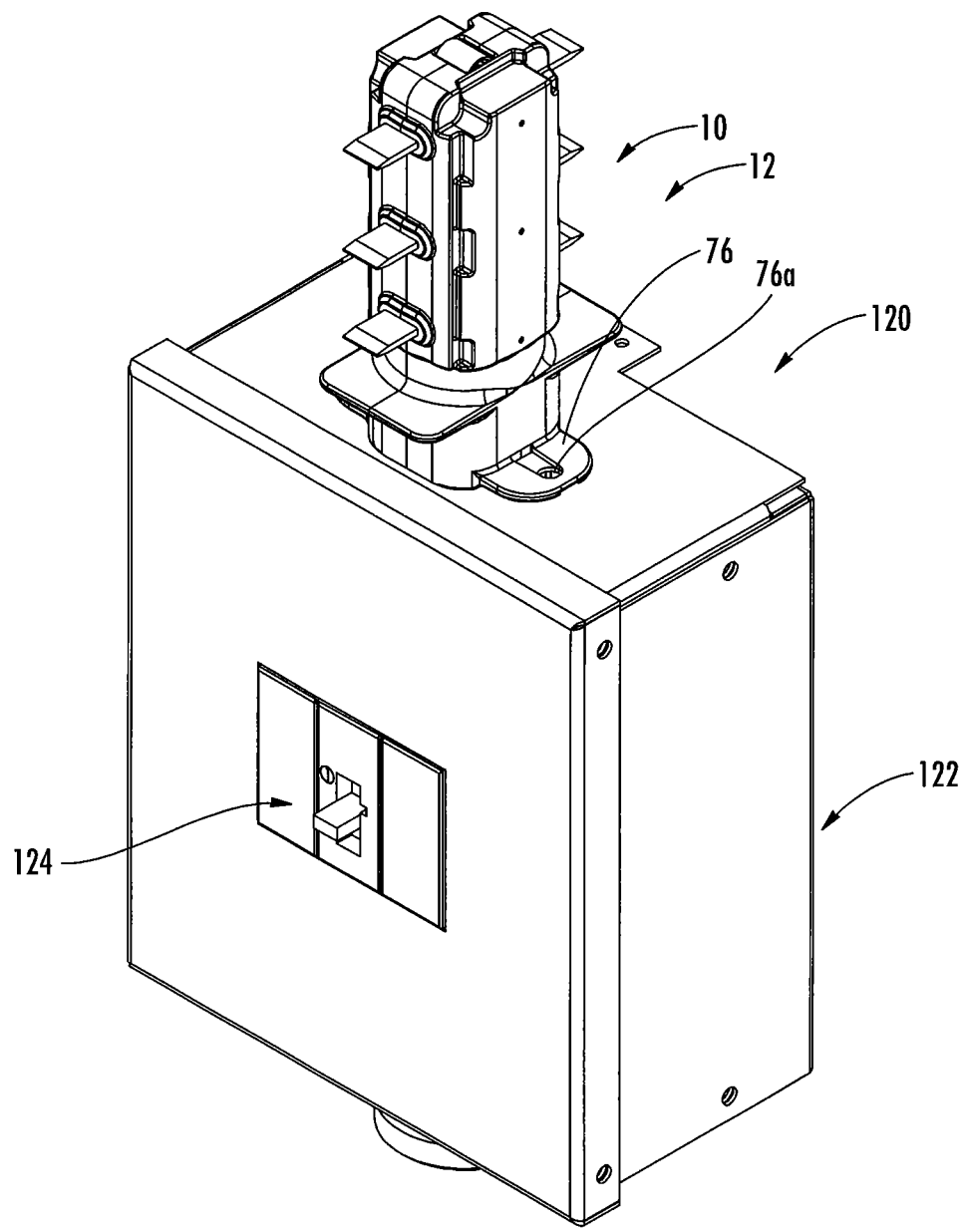
FIG. 17 is a perspective view of a plug-in device including the stab base assembly of FIG. 1 according to some embodiments.

A plug-in device or unit 120 is illustrated in FIG. 17. The plug-in device 120 includes the stab base assembly 10 coupled to a top of an enclosure 122 using the flanges 76, 78. The second ends $23_2$, $25_2$, $27_2$, $33_2$, $35_2$, $37_2$, $73_2$ of the cables 23, 25, 27, 33, 35, 37, 73 (FIGS. 12A-12C and 15) may extend into and be electrically connected to components in the enclosure in an interior thereof. As described in more detail below, the plug-in device 120 is configured to be received in and electrically connected to a busway system. The plug-in device 120 may be, for example, a bus plug, an outlet box or a tap off. The plug-in device 120 may include a protective device (e.g., breaker or fused) switch 124.

Figure 18:
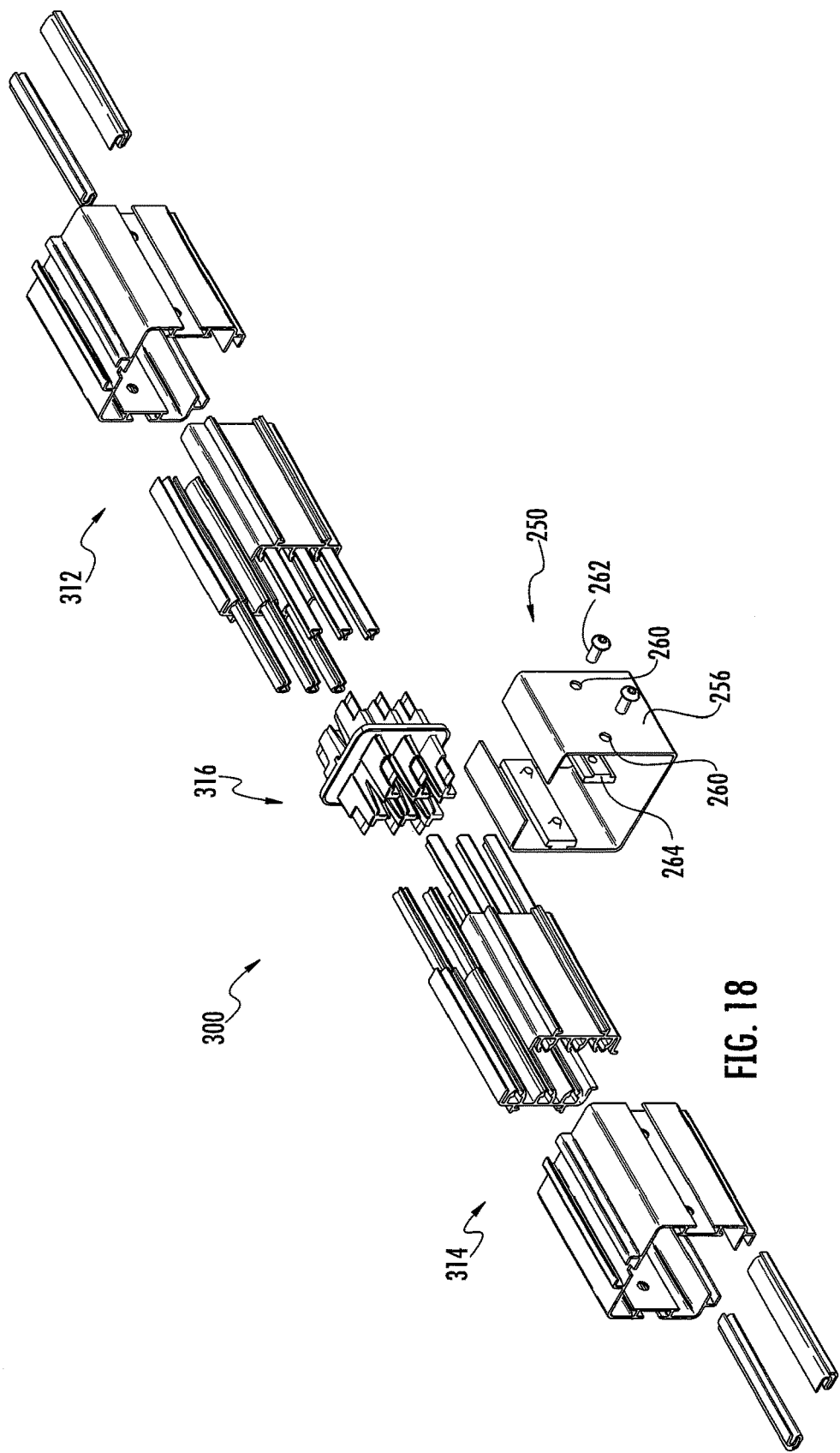
FIG. 18 is an exploded perspective view of a busway system according to some embodiments.

The stab assembly 10 and the plug-in device 120 may be used with a busway assembly or system such as the busway or bus duct system assembly 300 illustrated in FIG. 18. The busway assembly 300 includes first and second busway or bus duct sections 312, 314. A joint assembly 316 is disposed between the first and second busway sections 312, 314 to couple the busway sections 312, 314. The busway assembly 300 typically forms a portion of a larger busway system or busway run, and one or more additional busway sections, joint assemblies and/or other components may be included in the larger busway system.

Figure 19:
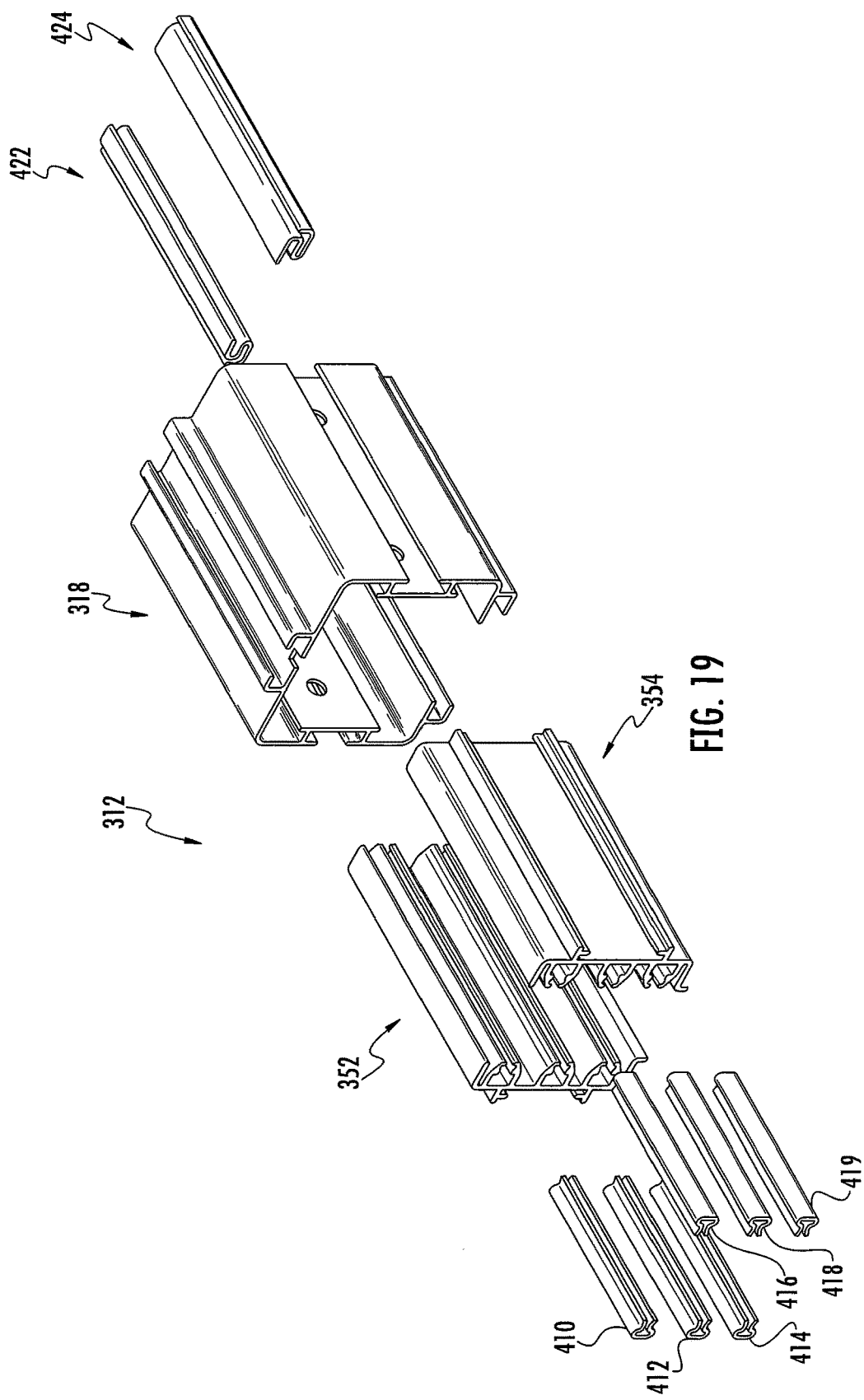
FIG. 19 is an exploded perspective view of a busway section according to some embodiments.

The busway section 312 is illustrated in FIG. 19. The busway section 314 has substantially the same structure as the busway section 312; accordingly, in the interest of brevity, only the busway section 312 will be described in detail below.

Figure 20:
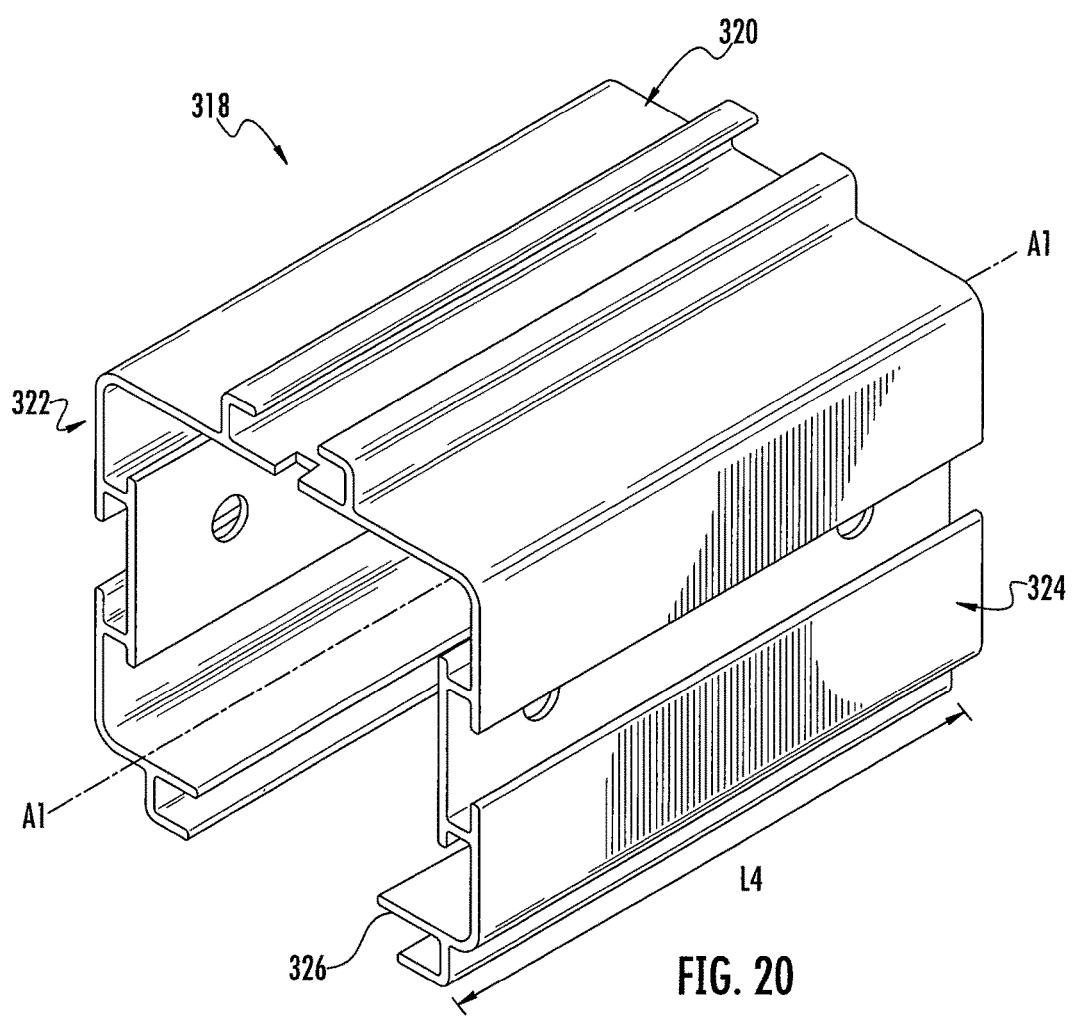
FIG. 20 is a perspective view of a housing of the busway section of FIG. 19.

The busway section 312 includes a housing 318. The housing 318 may be formed of any suitable material such as, for example, aluminum. Referring to FIG. 20, the housing 318 is elongated and defines a longitudinal axis A1. The housing 318 has a length L4. The length L3 may be between about 0.5 to 10 feet in various embodiments.

Figure 21:
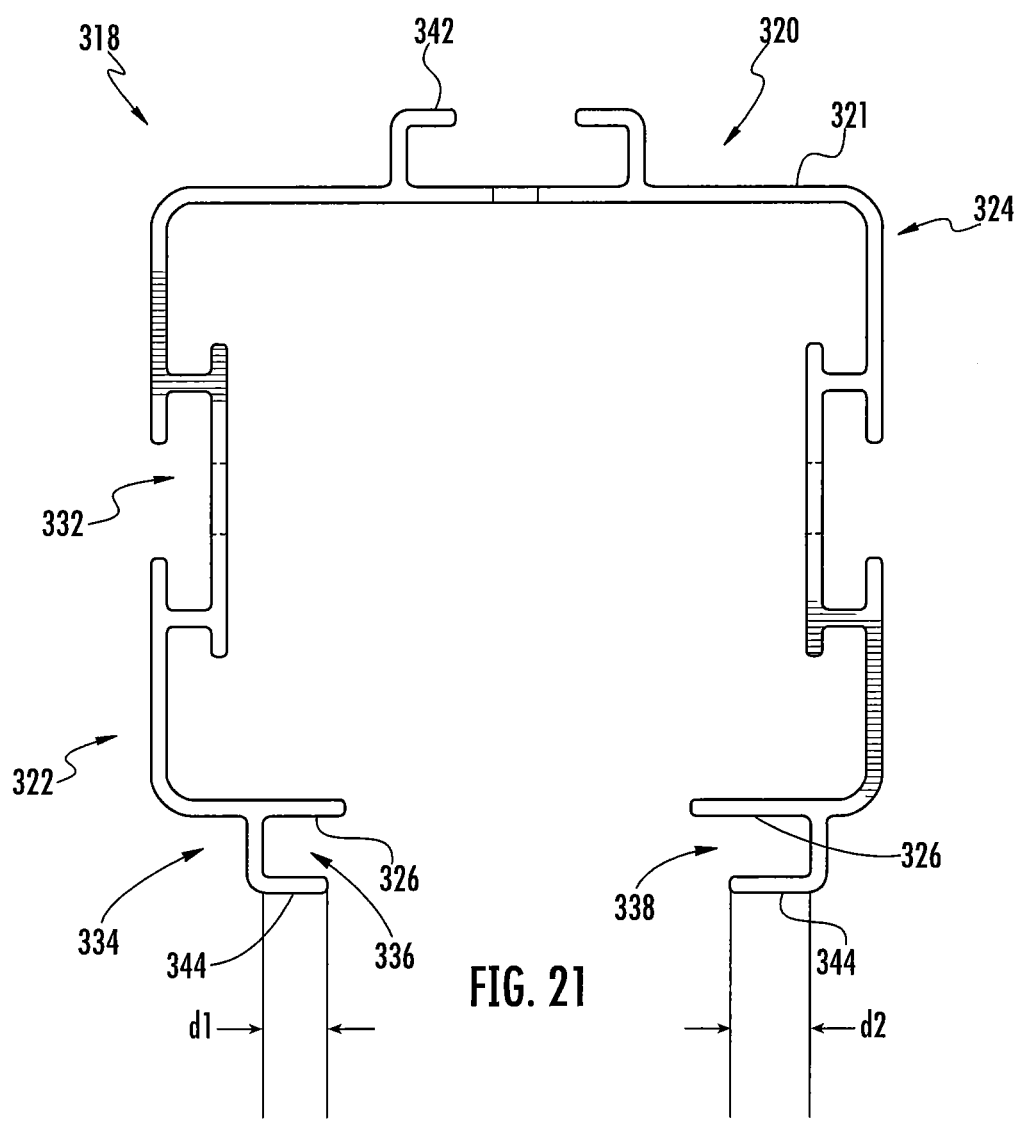
FIG. 21 is an end view of the housing of FIG. 20.

Referring to FIGS. 19-21, the housing 318 has a top or upper portion 320, a bottom or lower portion 334, and first and second opposing side portions 322, 324. A lower ledge 326 extends inwardly from each of the side portions 322, 324 and extends the length L4 of the housing 318. The housing side portions 322, 324 each include a channel 332.

The housing top portion 320 includes a pair of upper flanges 342 (e.g., substantially L-shaped opposed flanges) that extend from a top or upper wall 321. The flanges 342 may be used for mounting or suspending the busway section 312. A lower flange 344 (e.g., a substantially L-shaped flange) extends downwardly from each one of the ledges 326. The flanges 344 may be shaped and configured to receive finger safe seals as well as access barriers, as will be described in more detail below.

A first one of the lower ledges 326 and a first one of the lower flanges 344 define a first channel 336 at the first side 322 and the lower portion 334 of the housing 318. A second one of the lower ledges 326 and a second one of the lower flanges 344 define a second channel 338 at the second side 324 and the lower portion 334 of the housing 318. The first channel 336 has a laterally extending first depth d1 and the second channel 338 has a laterally extending second depth d2. The second depth d2 of the second channel 338 may be greater (longer) than the first depth d1 of the first channel 336.

Referring again to FIG. 19, the busway section 312 includes first and second insulators 352, 354. The first and second insulators 352, 354 are received in the housing 318 at the first and second side portions 322, 324, respectively (FIGS. 12 and 15). The insulators 352, 354 are continuous and may have the same length (L5 in FIG. 22) or about the same length as the length L4 of the housing 318 (FIG. 20).

Figure 22:
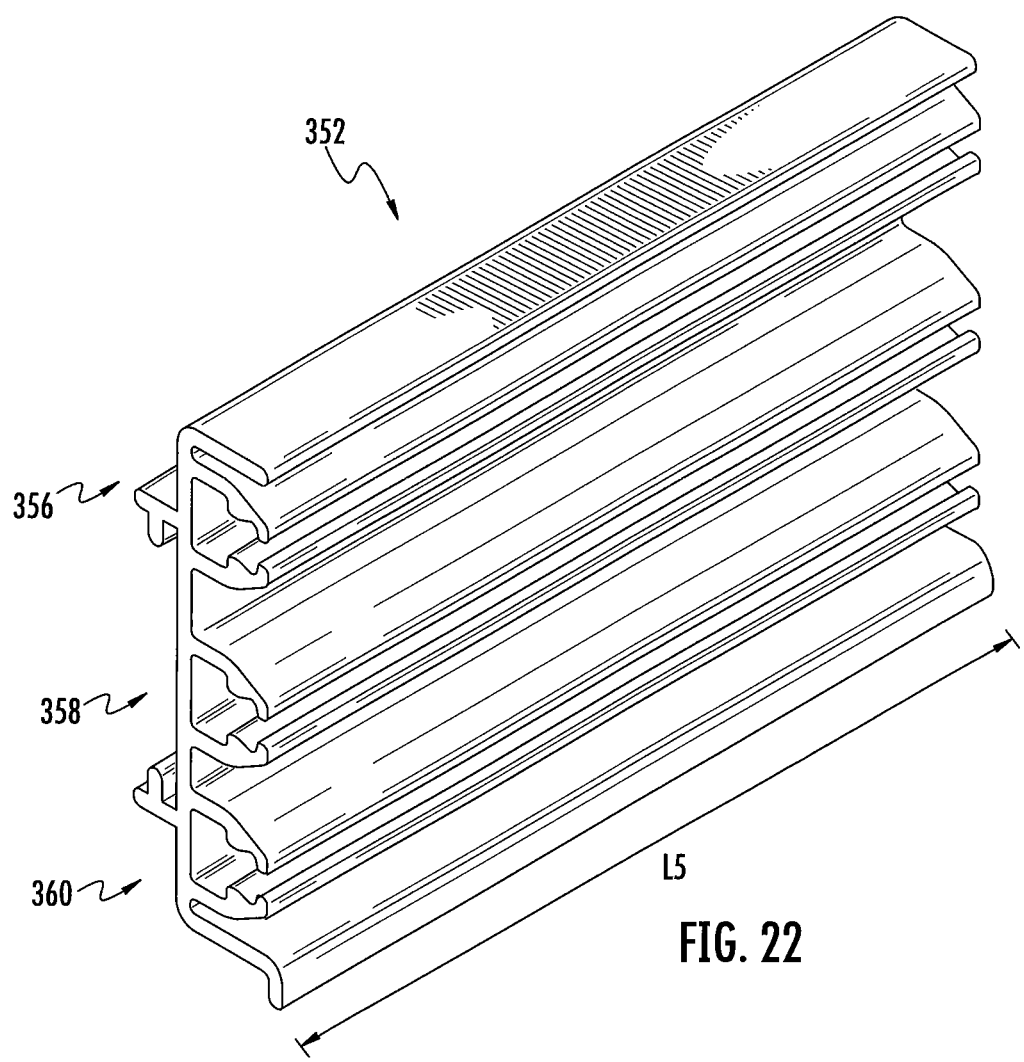
FIG. 22 is a perspective view of an insulator of the busway section of FIG. 19.
Figure 23:
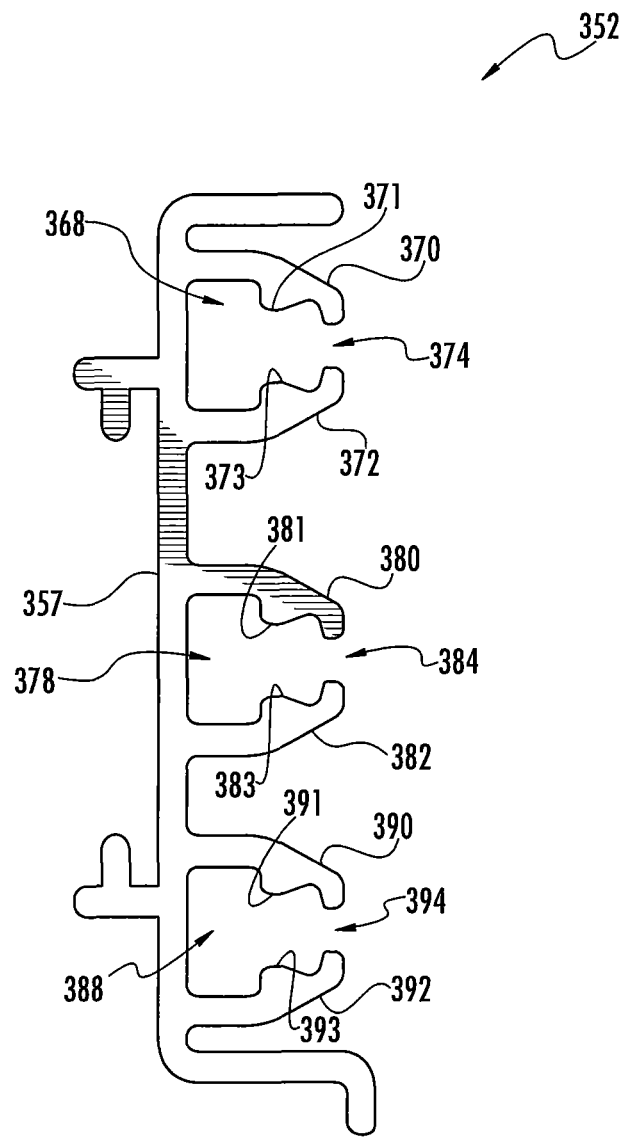
FIG. 23 is an end view of the insulator of FIG. 22.

A perspective view of the insulator 352 is shown in FIG. 22 and an end view of the insulator 352 is shown in FIG. 23. When viewed from the end, the insulator 354 is a mirror image of the insulator 352. Accordingly, in the interest of brevity, only the insulator 352 will be described in detail below.

Referring to FIG. 22, the insulator 352 includes a top or upper portion 356, a central or middle portion 358 and a bottom or lower portion 360. Referring to FIGS. 22 and 23, the insulator 352 includes an outer wall 357 that extends from the upper portion 356 to the lower portion 360 of the insulator 352. The upper portion 356 includes an upper channel 368 that is sized and configured to receive and/or hold a conductor or bus bar. Inwardly extending projections 370, 372 define an opening 374 to the channel 368. Each of the projections 370, 372 include a raised portion 371, 373 such that the channel 368 narrows between the raised portion 371, 373. The outer wall 357 and the projections 370, 372 define the upper channel 368.

The central portion 358 of the insulator 352 includes a channel 378 that is sized and configured to receive and/or hold a conductor or bus bar. Projections 380, 382 define an opening 384 to the channel 378. Each of the projections 380, 382 include a raised portion 381, 383 such that the channel 378 narrows between the raised portion 381, 383. The outer wall 357 and the projections 380, 382 define the central channel 368.

The lower portion 360 of the insulator 352 includes a channel 388 sized and configured to receive and/or hold a conductor or a bus bar. The channel 388 may have the same shape and/or size as the channel 368 and/or the channel 378. Projections 390, 392 define an opening 394 to the channel 388. Each of the projections 390, 392 include a raised portion 391, 393 such that the channel 388 narrows between the raised portion 391, 393. The outer wall 357 and the projections 390, 392 define the lower channel 388.

Figure 24:
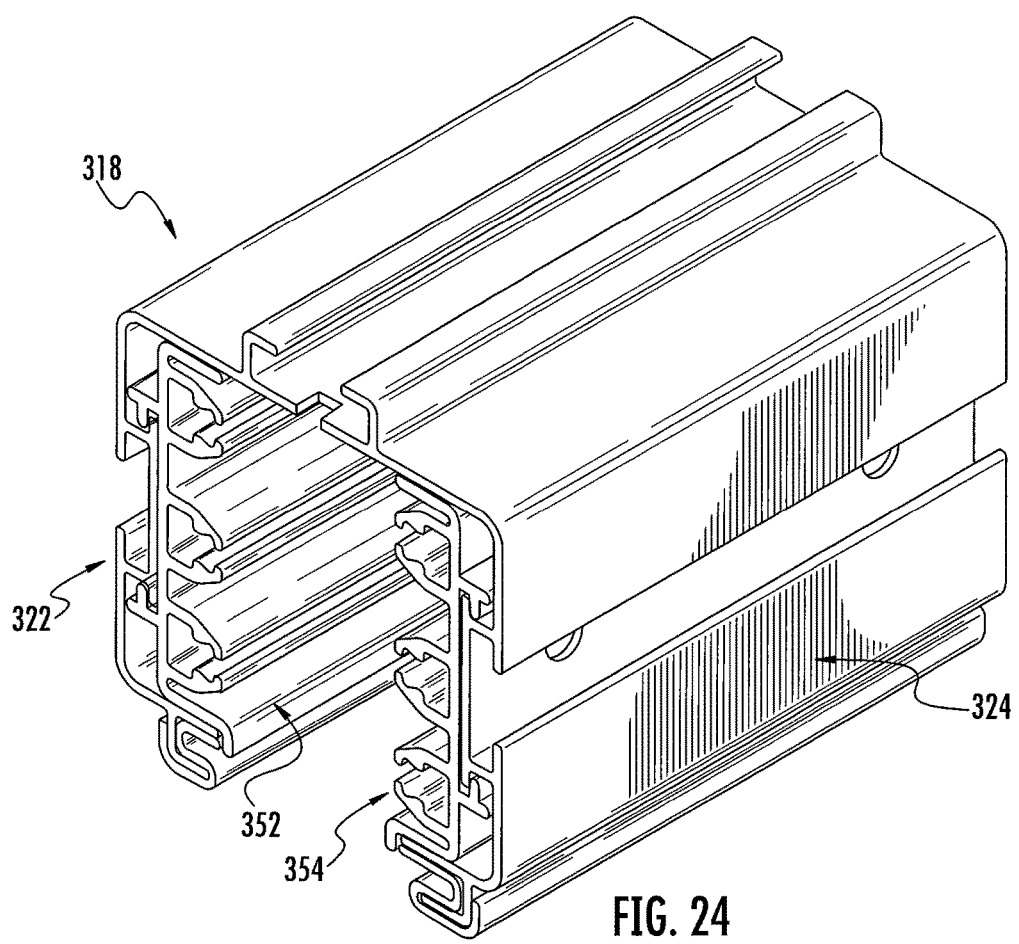
FIG. 24 is a perspective view of a housing holding two insulators of the busway section of FIG. 19.

FIG. 24 is a perspective view illustrating the insulators 352, 354 installed in the housing 318. Specifically, the insulator 352 is installed at the side portion 322 of the housing 318 and the insulator 354 is installed at the opposite side portion 324 of the housing 318. The insulators 352, 354 may extend continuously along the housing 318 (i.e., along the entire length L4 or substantially the entire length L4 of the housing 318). In some embodiments, the insulators 352, 354 are slidingly received in the housing 318 in the position shown in FIG. 24. The insulators 352, 354 may be slidingly received in the housing 318 in a direction that is parallel or substantially parallel to the housing longitudinal axis A1 (FIG. 20).

The housing 318 and the insulators 352, 354 are shaped and configured and have features such that the insulators 352, 354 can be aligned with the housing 318, guided into the housing 318 and/or held in place (e.g., securely held in place) in the housing 318. These features, along with additional details of the busway assembly 300, are described in co-pending and commonly owned U.S. patent application Ser. No. 15/443,112 entitled "Busway Systems and Related Assemblies and Methods", filed Feb. 27, 2017, the disclosure of which is incorporated by reference herein in its entirety.

The insulators 352, 354 may be formed of any suitable electrically insulating material. According to some embodiments, the insulators 352, 354 are formed of a polycarbonate or a thermoplastic polycarbonate. The insulators 352, 354 may be formed of Lupoy™ available from LG Chem (e.g., LG LUPOY NF 1005F03R).

Referring again to FIG. 19, the busway section 312 includes a plurality of conductors or bus bars 410, 412, 414, 416, 418, 419. The conductors or bus bars 410, 412, 414, 416, 418, 419 may be formed of any suitable electrically conductive material; an exemplary suitable material is copper or aluminum.

FIG. 25 is a perspective view of the bus bar conductor 410 and FIG. 26 is an end view of the conductor 410. The conductors 412, 414, 416, 418 and 419 are the same or substantially the same as the conductor 410; therefore, in the interest of brevity, only the conductor 410 will be described in detail below.

The conductor 410 has a length L6. According to some embodiments, the length L6 is less than the length L4 of the housing 318 (FIG. 20) and/or the length L5 of the insulators 352, 354 (FIG. 22). According to some embodiments, the length L6 of the conductor 410 is about 1 to 2 inches less than the length L4 of the housing 318 and/or the length L5 of the insulators 352, 354. According to some embodiments, the length L6 of the conductor 410 is about 1 to 1.25 inches less than the length L4 of the housing 318 and/or the length L5 of the insulators 352, 354.

Referring to FIG. 26, the conductor 410 may have a "butterfly" profile. More specifically, the conductor 410 includes a straight or substantially straight outer portion 410_O and opposite upper and lower (or first and second) curved or bent portions 410U, 410L. The upper portion 410U includes a first upper portion 410U1 that extends away from the outer portion 410_O and curves or bends downwardly and a second upper portion 410U2 that extends away from the first upper portion 410U1 and curves or bends upwardly. A contact surface 410S is defined between or at an interface of the first and second upper portions 410U1, 410U2 (although it will be understood that the contact surface 410S may be defined by a portion of the first upper portion 410U1 and/or a portion of the second upper portion 410U2). The second upper portion 410U2 terminates at a first inner end 410I1 of the conductor 410.

Similarly, the lower portion 410L includes a first lower portion 410L1 that extends away from the outer portion 410_O and curves or bends upwardly and a second lower portion 410L2 that extends away from the first lower portion 410L1 and curves or bends downwardly. A contact surface 410S is defined between or at an interface of the first and second lower portions 410L1, 410L2 (although it will be understood that the contact surface 410S may be defined by a portion of the first lower portion 410L1 and/or a portion of the second lower portion 410L2). The second lower portion 410L2 terminates at a second inner end 410I2 of the conductor 410.

The conductor outer portion 410_O and the upper and lower portions 410U, 410L define a lengthwise channel 410c. The channel 410c tapers inwardly from the first and second inner ends 410I1, 410I2 to the contact surface 410S of the conductor 410. In other words, the conductor 410 includes a flared opening 410F to the channel 410c. This may facilitate alignment and/or guidance for the insertion of a conductor or stab of a plug-in device to be received in the channel 410c.

The conductor 410 includes the double-sided (or dual pressure) contact surface 410S to provide increased contact surface area and/or compressive force on conductors received in the channel 410c of the conductor 410. As described in more detail herein, such conductors may be associated with stab base assemblies and/or plug-in devices.

It will be appreciated that each of the conductors 412, 414, 416, 418, 419 shares the same features and advantages described above in reference to the conductor 410. For example, each of the conductors 412, 414, 416, 418, 419 includes a double-sided contact surface 412S, 414S, 416S, 418S, 419S, a channel 412c, 414c, 416c, 418c, 419c, and a flared opening 412F, 414F, 416F, 418F, 419F as described above.

Figure 27:
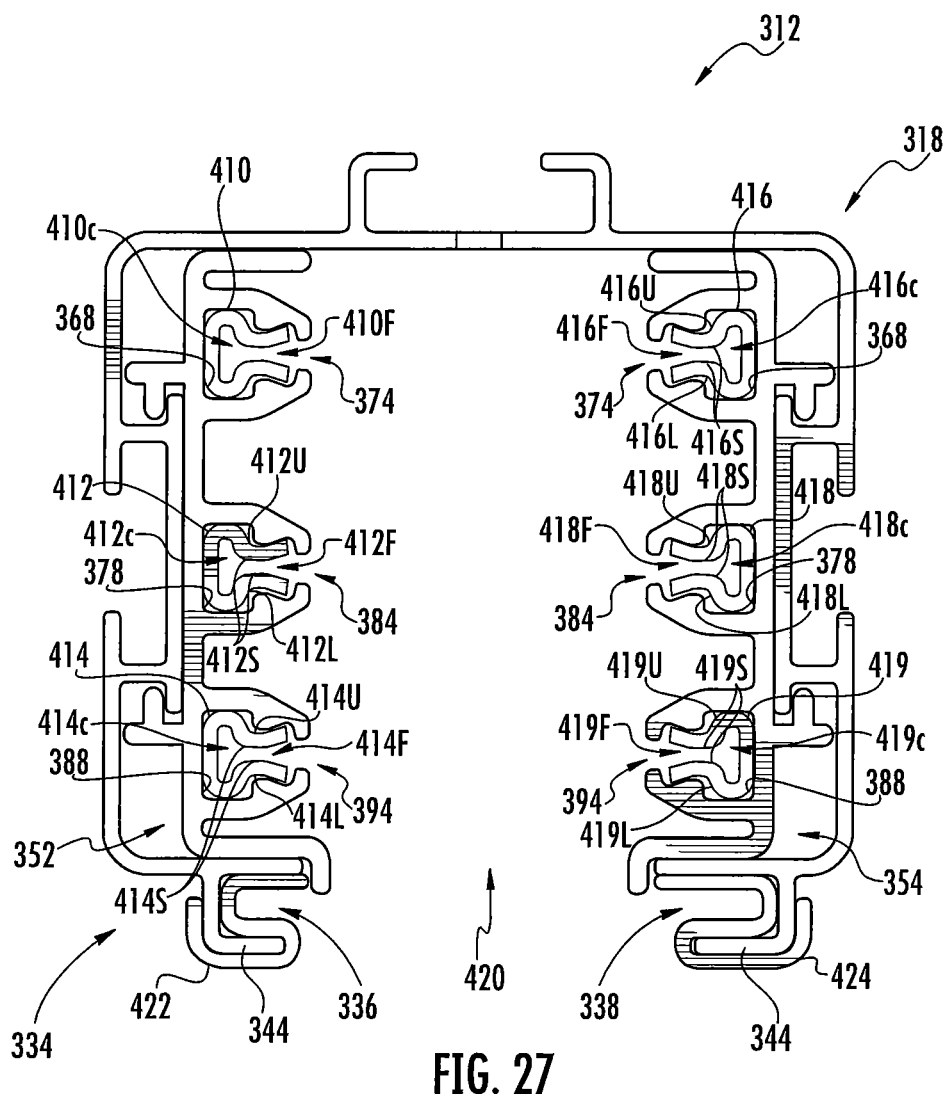
FIG. 27 is an end view of the busway section of FIG. 19 in an assembled state.

Turning to FIG. 27, the conductors or bus bars are received in channels defined in the insulators 352, 354. The conductors 410 and 412 are received in the channels 368 and 378 of the insulator 352, respectively. The conductor 416 is received in the channel 368 of the insulator 354. In some embodiments, the conductor 414 is received in the channel 388 of the insulator 352. In some embodiments, the conductor 418 is received in the channel 378 of the insulator 354. In some embodiments, the conductor 419 is received in the channel 388 of the insulator 354.

The conductors 410, 412 and 416 may be phase conductors or bus bars (e.g., the conductor 410 may be an A phase conductor, the conductor 412 may be a B phase conductor and the conductor 416 may be a C phase conductor), the conductor 414 may be a ground conductor or bus bar, and the conductor 418 may be a neutral conductor or bus bar. Such a configuration can be used for a three phase busway system, although other configurations are contemplated including single phase and two phase busway systems.

In some embodiments, the conductor 414, the conductor 418 and/or the conductor 419 may be omitted. For example, the conductor 414 may be omitted and the housing 318 may provide standard ground. Rails 264 of joint cover assembly 250 (FIG. 18) may serve as ground blocks (e.g., T-shaped ground blocks) to create and maintain a housing ground path. That is, when the joint cover 250 is installed for operation (e.g., when joint cover housing 256 is secured over the joint assembly 316 by, for example, receiving fasteners 262 through apertures 260 and the rails 264 with the rails received in the channels 332 of the busway housings), the ground block or rails 264 may form a housing ground path between adjacent busway sections 312, 314. Where used, the conductor 414 may be a ground conductor or bus bar for a 200% ground rating.

Where used, the conductor 418 may be a neutral conductor or bus bar and may provide standard neutral. Where used in combination with the conductor 418, the conductor 419 may be a neutral conductor or bus bar for a 200% neutral rating.

The conductors 410, 412, 414, 416, 418, 419 may all be the same size and shape. This may reduce manufacturing costs and provide reliability and repeatability of fit within the insulator channels and placement of the contact surface area for a conductor to be coupled thereto.

The upper and lower portions of each conductor (e.g., the upper and lower portions 410U, 410L of the conductor 410 shown in FIG. 26) may be resilient and able to flex. The raised portions of the insulator projections (e.g., the raised portions 371, 373 of the projections 370, 372 shown in FIG. 23) may be adjacent and/or abut the upper and lower portions of the conductor (e.g., the upper and lower portions 410U, 410L of the conductor 410 shown in FIG. 26) to help ensure that the upper and lower portions are spaced apart the correct distance.

The busway section 312 (e.g., the housing 318 and/or the insulators 352, 354) defines a channel 420 at the lower portion 334 of the housing 318 in which plug-in devices can be received and engage the conductors 410, 412, 414, 416, 418, 419. The channel 420 is continuous along the length L4 of the housing 318 (FIG. 20) such that the busway section 312 can be used with a continuous plug-in busway system.

Referring back to FIG. 19, the busway section 312 may include first and second finger safe lip seals 422, 424. As illustrated in FIG. 27, the seals 422, 424 are shaped and configured to be received along the lower flanges 344 of the housing 318. The seals 422, 424 are formed of an electrically insulating material (e.g., a polycarbonate or a thermoplastic polycarbonate material such as LG LUPOY NF 1005F03R) and provide a safety feature to help prevent or reduce the likelihood of contact with the housing 318 and/or the conductors 410, 412, 414, 416, 418, 419 during installation or maintenance or when installing a plug-in device in the channel 420.

The seals 422, 424 may be used so that the busway system complies with safety regulations such as the Underwriters Laboratories (UL) "Finger Safe Probe" standard. In some embodiments, the seals 422, 424 may be omitted and the design may include component interface dimensions to comply with the UL "Finger Safe Probe" standard.

Figure 28:
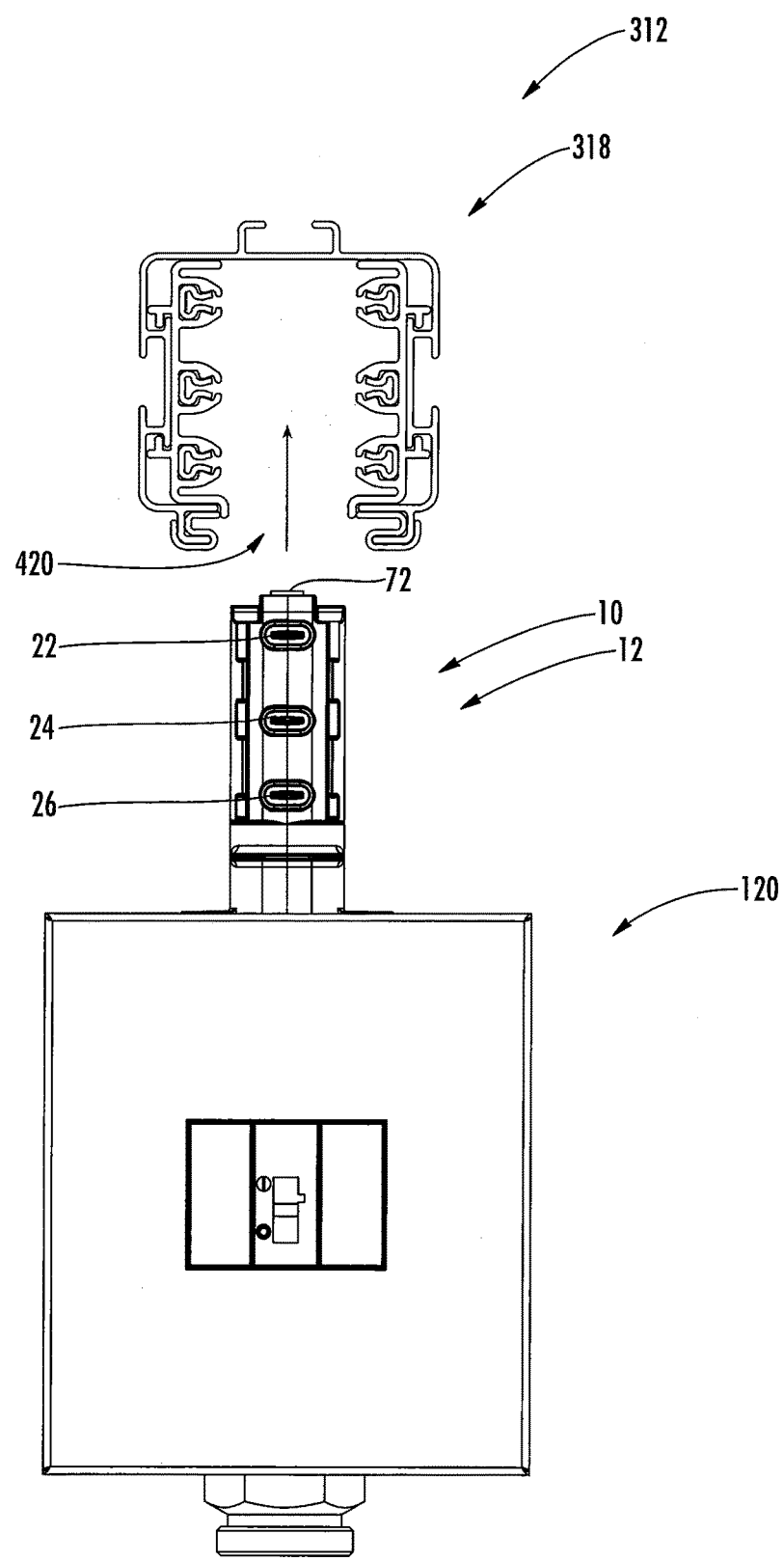
FIG. 28 illustrates the plug-in device of FIG. 17 positioned below the busway section of FIG. 27.
Figure 29:
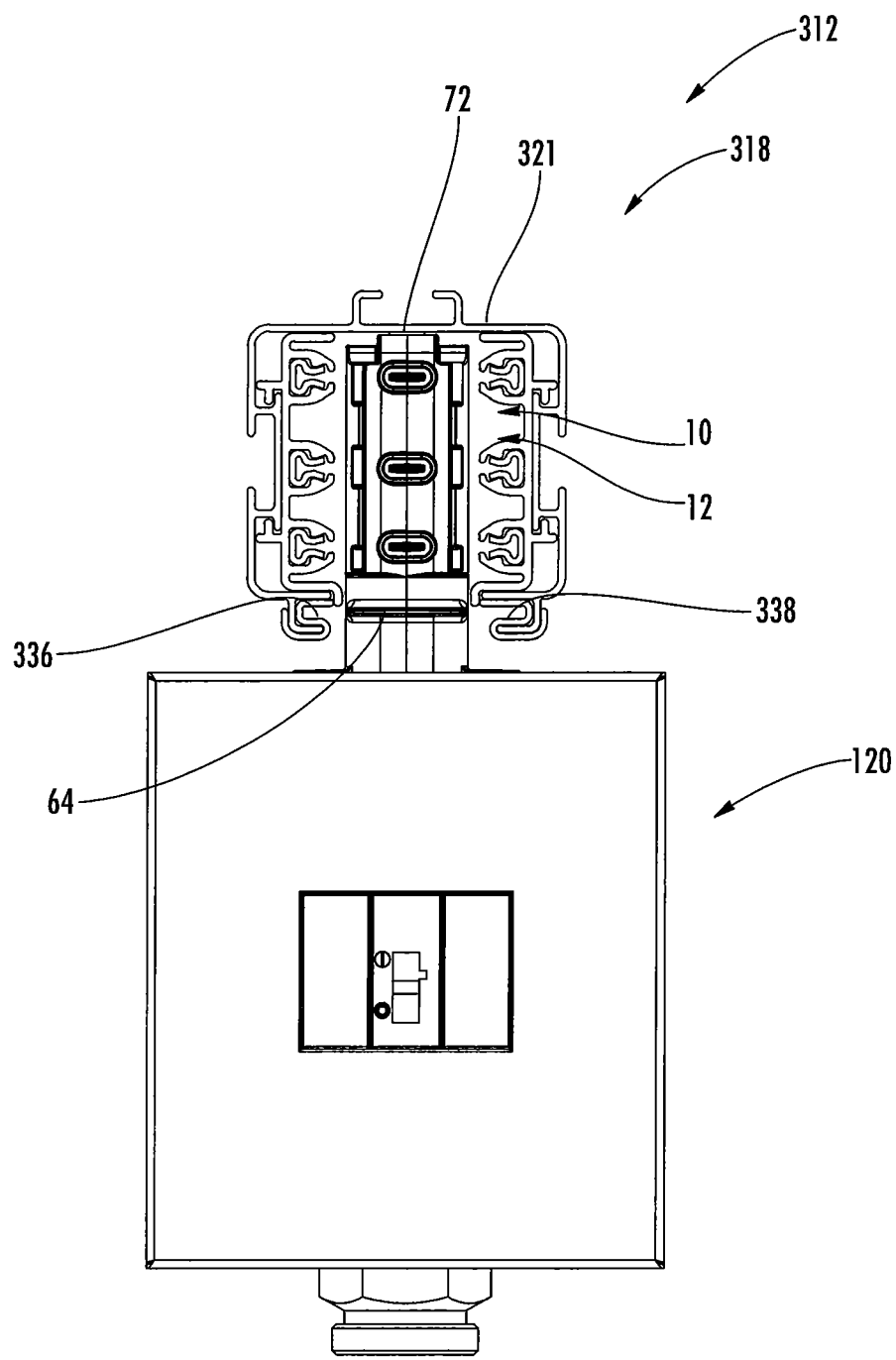
FIG. 29 illustrates the plug-in device positioned in the busway section of FIG. 27 in a first position.

The stab base assembly 10 and the plug-in device 120 may be electrically connected to the busway as will now be described. Referring to FIG. 28, the stab base assembly 10 is positioned below the opening 420 of the housing 318 of the busway section 312. Referring to FIGS. 28 and 29, the stab base assembly 10 is moved or urged upwardly through the opening 420 to a first position in the busway section 312 or busway housing 318. In the first position, the first and second stab conductors 22, 24 (FIG. 1) and the stab conductor 32 (FIG. 2) each extend away from the stab base housing 12 in a direction that is parallel or substantially parallel to the longitudinal axis A1 of the busway housing 318 (FIG. 20). Where used, the stab conductors 26, 34, and/or 36 also extend away from the stab base housing 12 in a direction that is parallel or substantially parallel to the longitudinal axis A1 of the busway housing 318 in the first position.

Also in the first position, the ground stab conductor 72 contacts the upper wall 321 of the busway housing 318. This helps ensure that the stab base assembly 10 and the plug-in device 120 are grounded before being electrically connected to the busway.

Figure 30:
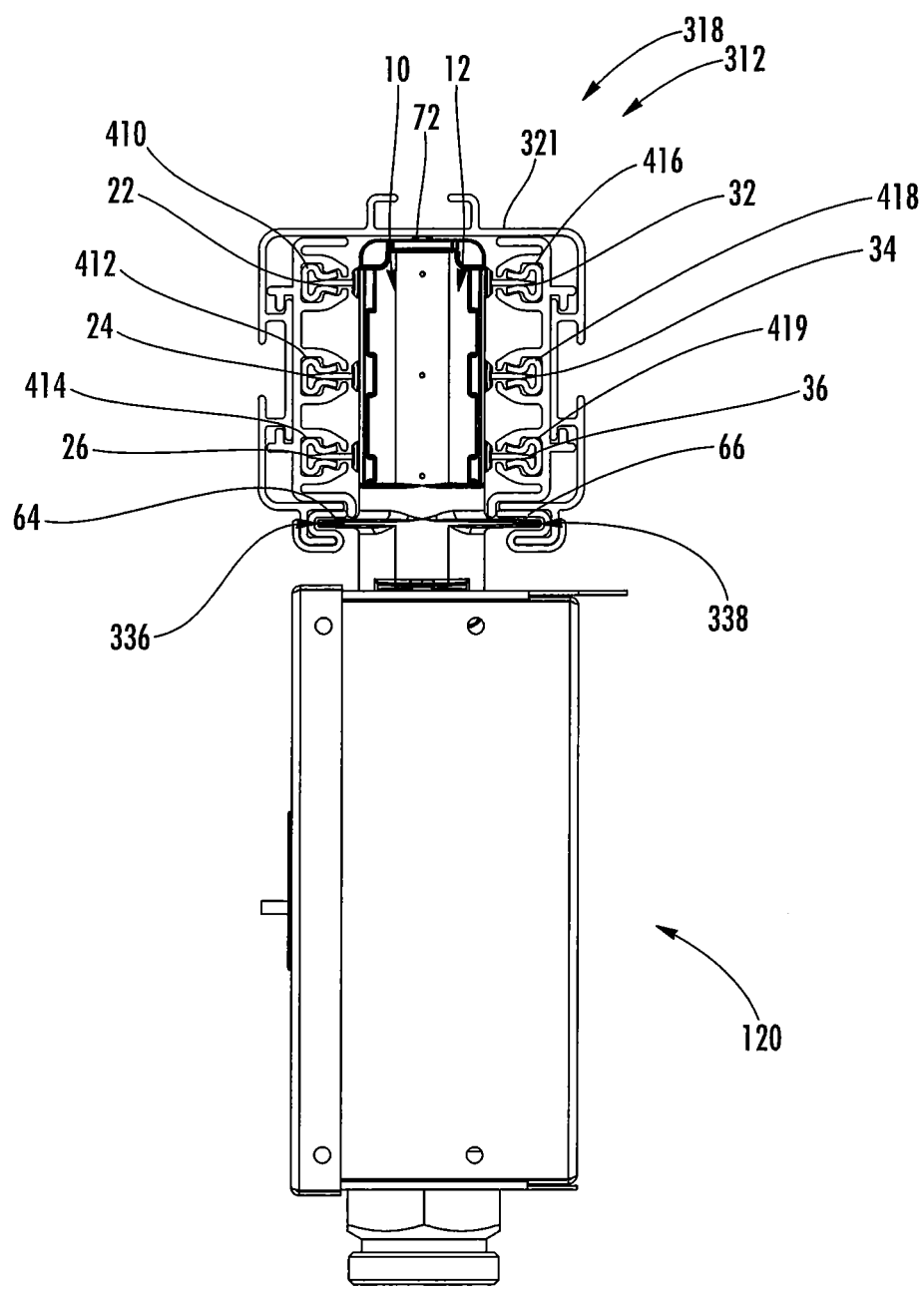
FIG. 30 illustrates the plug-in device positioned in the busway section of FIG. 27 in a second position.

The stab base assembly 10 is then rotated to a second position illustrated in FIG. 30. The stab base assembly 10 and the plug-in device 120 are electrically connected to the busway in the second position. More specifically, the stab conductor 22 is electrically connected with the bus bar conductor 410, the stab conductor 24 is electrically connected with the bus bar conductor 412 and the stab conductor 32 is electrically connected with the bus bar conductor 418 in the second position. In addition, where used, the stab conductor 26 is electrically connected with the bus bar conductor 414, the stab conductor 34 is electrically connected with the bus bar conductor 418, and/or the stab conductor 36 is electrically connected with the bus bar conductor 419 in the second position. Referring to FIG. 27, the configuration of the insulators 352, 354 with the projections and the shape of the conductors 410, 412, 414, 416, 418, 419 may facilitate guiding the stabs into contact with the bus bar conductors.

More specifically, referring to FIGS. 27 and 30, the stab conductors 22, 24, 26, 32, 34 and/or 36 may be slidingly received in the channels 410c, 412c, 414c, 416c, 418c and/or 419c, respectively, of the busway section conductors 410, 412, 414, 416, 417, 418 and/or 419 when the stab base assembly 10 is rotated from the first to the second position. The tapered portions 22t, 24t, 26t, 32t, 34t and 36t at one end of the stab conductors 22, 24, 26, 32, 34 and 36 may help facilitate insertion into the busway section conductor channels 410c, 412c, 414c, 416c, 418c and 419c when the stab base assembly 10 is rotated from the first position to the second position. Each stab conductor is slidingly received between the upper and lower portions of the corresponding busway section conductor and makes contact with the contact surface defined thereby. For example, the stab conductor 24 is received in the channel 412c defined by the busway section conductor 412. The stab conductor 24 is received between the upper and lower portions 412U, 412L of the conductor 412 and contacts the contact surface 412S defined by the upper and lower portions 412U, 412L of the conductor 412.

The ground stab conductor 70 continues to contact the upper wall 321 of the busway housing 318 when the stab base assembly 10 is rotated from the first position to the second position. As described above, the ground conductor 72 may be resilient and configured to translate up and down as needed during rotation to maintain contact with the upper wall 321 of the busway housing 318.

The configuration of the alignment tabs 64, 66 of the stab base housing 12 and/or the channels 336, 338 of the busway housing 318 help ensure electrical polarity between the proper phasing when the stab base assembly 10 is rotated from the first position to the second position. More specifically, the relatively longer second alignment tab 66 can be received in the relatively deeper channel 338 when the stab base assembly 10 is rotated from the first position to the second position. However, the second alignment tab 66 is too long to be received in the shallower channel 336.

Put another way, the stab base assembly 10 can only be rotated in one rotational direction from the first position shown in FIG. 29 to reach the second position shown in FIG. 30. As illustrated, the stab base assembly can only be rotated in the counterclockwise direction to reach the second position such that the stab conductors are electrically connected with the bus bar conductors of the busway. This prevents an electrical connection with incorrect polarity. Referring again to FIGS. 1 and 2, the stab base housing 12 includes a first rounded portion 80 above the first alignment tab 64 and a second rounded portion 82 above the second alignment tab 66. The first and second rounded portions 80, 82 may be concave portions. The first and second rounded portions 80, 82 facilitate sliding of the first and second alignment tabs 64, 66 in the first and second busway housing channels 336, 338, respectively, when the stab base assembly 10 is rotated from the first position to the second position. The rounded portions 80, 82 may help prevent the stab base housing 12 from binding in the busway housing 318 during rotation.

The alignment feature of the stab base housing may take other forms. As just one example, the stab base housing 12 may include channels, recesses or slots defined therein and the busway housing 318 may include tabs configured to be received in the channels of the stab base housing 12. The tabs and the channels may be sized to allow rotation in only one rotational direction.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A plug-in device for use with a busway system comprising a busway housing defining a longitudinal axis, the plug-in device comprising:
   a stab base housing having first and second opposite sides;
   one or more stab conductors extending out of and away from the stab base housing at the first side of the stab base housing;
   one or more stab conductors extending out of and away from the stab base housing at the second side of the stab base housing; and
   a ground conductor at an upper portion of the stab base housing;
   wherein the stab base housing is configured to be received through an opening at a bottom portion of the busway housing and positioned in a first position with each stab conductor extending away from the stab base housing in a direction substantially parallel to the longitudinal axis of the busway housing and with the ground conductor contacting a top wall of the busway housing;
   wherein the stab base housing is configured to be rotated from the first position to a second position with each stab conductor extending away from the stab base housing in a direction substantially perpendicular to the longitudinal axis of the busway housing and with the ground conductor contacting the top wall of the busway housing;
   wherein:
      an enclosure is coupled to a lower portion of the stab base housing;
      a cable extends from each stab conductor and from the ground conductor to outside the stab base housing at the lower portion thereof; and
      each cable is electrically connected to one or more components in the enclosure.

2. The plug-in device of claim 1 wherein:
the ground conductor extends upwardly from the upper portion of the stab base housing above a top of the stab base housing; and
the ground conductor is resilient and configured to translate up and down relative to the stab base housing in response to contacting the top wall of the busway housing.

3. The plug in device of claim 1 wherein:
the stab base housing comprises first and second opposing walls with each of the first and second walls extending between the first and second sides of the stab base housing;
the plug-in device comprises a cable management member in an interior cavity of the stab base housing, the cable management member comprising a central portion, a first side portion extending away from the central portion at one side thereof, and a second side portion extending away from the central portion at an opposite side thereof;
the first side portion of the cable management member is coupled to the first wall of the stab base housing and the second side portion of the cable management member is coupled to the second wall of the stab base housing.

4. The plug-in device of claim 1 wherein:
the one or more stab conductors extending out of and away from the stab base housing at the first side of the stab base housing comprise first and second phase conductors; and
the one or more stab conductors extending out of and away from the stab base housing at the second side of the stab base housing comprise a third phase conductor.

5. The plug-in device of claim 1 wherein:
each stab conductor is L-shaped with a first portion and a second portion that is perpendicular to the first portion;
the first portion of each stab conductor extends out of and away from the stab base housing; and
the second portion of each stab conductor is at least partially held in a channel defined in the stab base housing.

6. The plug-in device of claim 1 wherein:
the stab base housing comprises an alignment feature configured to allow rotation of the stab base housing from the first position to the second position in only one rotational direction;
the alignment feature comprises a first alignment tab on the first side of the stab base housing and a second alignment tab on the second side of the stab base housing; and
the first alignment tab has a first length and the second alignment tab has a second length that is greater than the first length.

7. The plug-in device of claim 1 wherein each of the stab conductors comprises an end portion that is tapered such that the end portion narrows in thickness from a central portion to an end of the stab conductor.

8. A plug-in device for use with a busway system comprising a busway housing defining a longitudinal axis, the plug-in device comprising:
a stab base housing having first and second opposite sides;
one or more stab conductors extending out of and away from the stab base housing at the first side of the stab base housing;
one or more stab conductors extending out of and away from the stab base housing at the second side of the stab base housing; and
a ground conductor at an upper portion of the stab base housing;
wherein the stab base housing is configured to be received through an opening at a bottom portion of the busway housing and positioned in a first position with each stab conductor extending away from the stab base housing in a direction substantially parallel to the longitudinal axis of the busway housing and with the ground conductor contacting a top wall of the busway housing;
wherein the stab base housing is configured to be rotated from the first position to a second position with each stab conductor extending away from the stab base housing in a direction substantially perpendicular to the longitudinal axis of the busway housing and with the ground conductor contacting the top wall of the busway housing;
wherein:
the stab base housing comprises first and second opposing walls with each of the first and second walls extending between the first and second sides of the stab base housing;
the plug-in device comprises a cable management member in an interior cavity of the stab base housing, the cable management member comprising a central portion, a first side portion extending away from the central portion at one side thereof, and a second side portion extending away from the central portion at an opposite side thereof;
the first side portion of the cable management member is coupled to the first wall of the stab base housing and the second side portion of the cable management member is coupled to the second wall of the stab base housing;
the plug-in device further comprises a first cable having a first end electrically connected to the ground conductor and a second, opposite end extending out of a bottom portion of the stab base housing;
the cable management member central portion defines an elongate passageway; and
the first cable is received in the passageway of the cable management member central portion.

9. The plug-in device of claim 8 wherein:
an enclosure is coupled to a lower portion of the stab base housing;
a cable extends from each stab conductor to outside the stab base housing at the lower portion thereof; and
each cable is electrically connected to components in the enclosure.

10. A plug-in device for use with a busway system comprising a busway housing defining a longitudinal axis, the plug-in device comprising:
a stab base housing having first and second opposite sides;
one or more stab conductors extending out of and away from the stab base housing at the first side of the stab base housing;
one or more stab conductors extending out of and away from the stab base housing at the second side of the stab base housing; and
a ground conductor at an upper portion of the stab base housing;
wherein the stab base housing is configured to be received through an opening at a bottom portion of the busway housing and positioned in a first position with each stab conductor extending away from the stab base housing in a direction substantially parallel to the longitudinal axis of the busway housing and with the ground conductor contacting a top wall of the busway housing;

wherein the stab base housing is configured to be rotated from the first position to a second position with each stab conductor extending away from the stab base housing in a direction substantially perpendicular to the longitudinal axis of the busway housing and with the ground conductor contacting the top wall of the busway housing;

wherein:

the stab base housing comprises first and second opposing walls with each of the first and second walls extending between the first and second sides of the stab base housing;

the plug-in device comprises a cable management member in an interior cavity of the stab base housing, the cable management member comprising a central portion, a first side portion extending away from the central portion at one side thereof, and a second side portion extending away from the central portion at an opposite side thereof;

the first side portion of the cable management member is coupled to the first wall of the stab base housing and the second side portion of the cable management member is coupled to the second wall of the stab base housing;

the plug-in device further comprising:

a first cable having a first end electrically connected to the first phase conductor and a second, opposite end extending out of a bottom portion of the stab base housing;

a second cable having a first end electrically connected to the second phase conductor and a second, opposite end extending out of the bottom portion of the stab base housing;

a third cable having a first end electrically connected to the third phase conductor and a second, opposite end extending out of the bottom portion of the stab base housing.

11. The plug-in device of claim 10 wherein the first cable extends external to and along one of the first and second side portions of the cable management member.

12. The plug-in device of claim 11 wherein the second cable extends external to and along the other one of the first and second side portions of the cable management member.

13. The plug-in device of claim 11 wherein:

the first and second side portions of the cable management member each include a laterally extending side with a first face and a second opposite face;

the first cable extends along the first face of one of the first and second side portions of the cable management member; and the third cable extends along the second face of one of the first and second side portions of the cable management member.

14. The plug-in device of claim 10 wherein:

the one or more stab conductors extending out of and away from the stab base housing at the second side of the stab base housing comprise the third phase conductor and a neutral conductor;

the plug-in device further comprises a fourth cable having a first end electrically connected to the neutral conductor and a second, opposite end extending out of the bottom portion of the stab base housing;

the third cable extends external to and along one of the first and second side portions of the cable management member.

15. The plug-in device of claim 14 wherein the fourth cable extends along the other one of the first and second side portions of the cable management member.

16. A busway system comprising:

a busway section comprising:

a busway housing defining a longitudinal axis, the busway housing comprising first and second opposite side portions;

a first insulator held in the first side portion of the busway housing, the first insulator holding one or more bus bar conductors; and a second insulator held in the second side portion of the housing, the second insulator holding one or more bus bar conductors; and a plug-in device comprising:

a stab base housing having first and second opposite sides;

one or more stab conductors extending out of and away from the stab base housing at the first side of the stab base housing;

one or more stab conductors extending out of and away from the stab base housing at the second side of the stab base housing; and a ground conductor extending upwardly out of an opening at an upper portion of the stab base housing;

wherein the stab base housing is configured to be received through an opening at a bottom portion of the busway housing and positioned in a first position with each stab conductor extending away from the stab base housing in a direction substantially parallel to the longitudinal axis of the busway housing and the ground conductor contacting a top wall of the busway housing;

wherein the stab base housing is configured to be rotated from the first position to a second position with each stab conductor extending away from the stab base housing in a direction substantially perpendicular to the longitudinal axis of the busway housing to electrically connect each stab conductor with one of the bus bar conductors;

wherein the ground conductor extends above a top of the stab base housing and is resilient and configured translate up and down relative to the stab base housing in response to contacting the top wall of the busway housing;

wherein:

a cable management member is positioned in an interior cavity of the stab base housing;

the ground conductor comprises an arcuate center portion and first and second side portions that are attached to the stab base housing above the cable management member;

a first cable is electrically connected to the lower surface of the ground conductor; and the first cable extends downwardly through a channel defined in a central portion of the cable management member and out of a lower portion of the stab base housing.

17. The system of claim 16 wherein:

the one or more stab conductors extending out of and away from the stab base housing at the first side of the stab base housing comprise first and second phase conductors;

the one or more stab conductors extending out of and away from the stab base housing at the second side of the stab base housing comprise a third phase conductor;

the cable management member includes a first side portion extending outwardly away from a first side of the central portion and a second side portion extending outwardly away from a second, opposite side of the central portion;

a second cable is electrically connected to a the first phase conductor, a third cable is electrically connected to the second phase conductor, and a fourth cable is electrically connected to the third phase conductor;

the second cable extends along a first face of the first side portion of the cable management member and out of the lower portion of the stab base housing;

the third cable extends along a first face of the second side portion of the cable management member and out of the lower portion of the stab base housing; and the fourth cable extends along either a second, opposite face of the first side portion of the cable management member or a second, opposite face of the second side portion of the cable management member and out of the lower portion of the stab base housing.

18. The system of claim 16 wherein:

each bus bar conductor held in the first insulator comprises an upper portion and an opposite lower portion; and each bus bar conductor held in the second insulator comprises an upper portion and an opposite lower portion;

in the second position, each one of the stab conductors extending out of and away from the stab base housing at the first side of the stab base housing is received between and contacts the upper and lower portions of one of the bus bar conductors held in the first insulator to be electrically connected therewith; and in the second position, each one of the stab conductors extending out of and away from the stab base housing at the second side of the stab base housing is received between and contacts the upper and lower portions of one of the bus bar conductors held in the second insulator to be electrically connected therewith.

19. The system of claim 16 wherein each of the stab conductors comprises an end portion that is tapered such that the end portion narrows in thickness from a central portion to an end of the stab conductor.

20. The system of claim 16 wherein:

the stab base housing includes a first alignment tab on the first side of the stab base housing and a second alignment tab on the second side of the stab base housing;

the first alignment tab has a first length and the second alignment tab has a second length that is greater than the first length;

the busway housing includes a first channel and a second channel at the bottom portion of the busway housing;

the first channel has a first depth and the second channel has a second depth that is greater than the first depth; and the first alignment tab is received in the first channel and the second alignment tab is received in the second channel when the stab base housing is in the second position.

* * * * *

UNITED STATES PATENT AND TRADEMARK OFFICE
CERTIFICATE OF CORRECTION

PATENT NO. : 10,211,581 B2
APPLICATION NO. : 15/587731
DATED : February 19, 2019
INVENTOR(S) : Wynnik et al.

It is certified that error appears in the above-identified patent and that said Letters Patent is hereby corrected as shown below:

In the Specification

Column 15, Line 2: Please correct "41011" to read -- 410I1 --

Column 15, Line 13: Please correct "41012" to read -- 410I2 --

Column 15, Line 18: Please correct "41011, 41012" to read -- 410I1, 410I2 --

Signed and Sealed this
Twenty-first Day of May, 2019

Andrei Iancu
*Director of the United States Patent and Trademark Office*